July 11, 1950 L. E. THOMPSON 2,514,425

RADIO RELAYING

Filed Feb. 6, 1945 11 Sheets-Sheet 1

INVENTOR
LELAND E. THOMPSON.
BY H. G. Grover
ATTORNEY

RADIO RELAYING

Filed Feb. 6, 1945 11 Sheets-Sheet 2

INVENTOR
LELAND E. THOMPSON.
BY H. S. Grover
ATTORNEY

July 11, 1950 L. E. THOMPSON 2,514,425

RADIO RELAYING

Filed Feb. 6, 1945 11 Sheets-Sheet 3

INVENTOR
LELAND E. THOMPSON.
BY H. S. Grover
ATTORNEY

July 11, 1950 L. E. THOMPSON 2,514,425

RADIO RELAYING

Filed Feb. 6, 1945 11 Sheets-Sheet 4

INVENTOR.
LELAND E. THOMPSON
BY H. S. Grover
ATTORNEY.

INVENTOR.
LELAND E. THOMPSON
BY H. S. Brown
ATTORNEY.

INVENTOR.
LELAND E. THOMPSON
BY
H. S. Grover
ATTORNEY.

July 11, 1950 L. E. THOMPSON 2,514,425

RADIO RELAYING

Filed Feb. 6, 1945 11 Sheets-Sheet 7

INVENTOR.
LELAND E. THOMPSON

BY H. S. Grover

ATTORNEY.

RADIO RELAYING
Filed Feb. 6, 1945 11 Sheets-Sheet 8
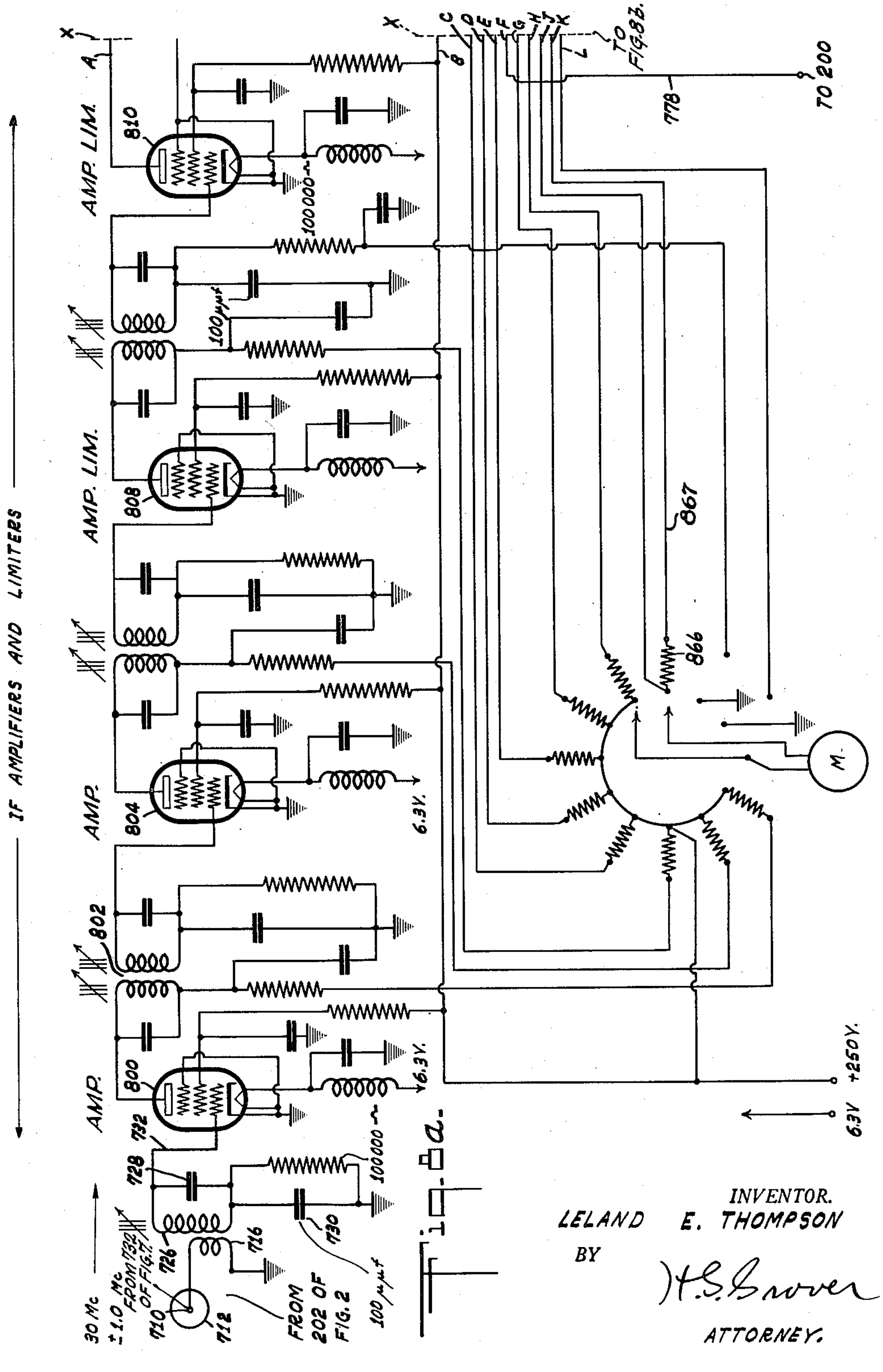
INVENTOR.
LELAND E. THOMPSON
BY
H.S. Grover
ATTORNEY.

RADIO RELAYING

Filed Feb. 6, 1945

INVENTOR.
LELAND E. THOMPSON
BY H. S. Grover
ATTORNEY.

INVENTOR.
LELAND E. THOMPSON
BY H. S. Grover
ATTORNEY.

July 11, 1950 L. E. THOMPSON 2,514,425

RADIO RELAYING

Filed Feb. 6, 1945 11 Sheets-Sheet 11

INVENTOR.
LELAND E. THOMPSON
BY H. S. Grover
ATTORNEY.

Patented July 11, 1950

2,514,425

UNITED STATES PATENT OFFICE 2,514,425

RADIO RELAYING

Leland E. Thompson, Merchantville, N. J., assignor to Radio Corporation of America, a corporation of Delaware Application February 6, 1945, Serial No. 576,453

13 Claims. (Cl. 250—9)

My present invention deals with radio relaying in which the radio waves employed have frequencies of the order of thousands of megacycles per second. Although many of the features and principles of my invention are described in connection with a radio relaying system operating at very short waves they are not, of course, restricted thereto and have more general application in other systems and apparatus, as will be evident as the description thereof proceeds.

Radio relaying is useful for many purposes. For example, radio relays may be used to convey a program originating in a studio to a distant broadcast transmitter. The relay offers advantages over wire lines for that purpose since the wire lines are expensive to construct and have serious limitations with respect to frequency band widths which they are capable of transmitting. In general, unless carefully designed, costly wire lines are built, there may be serious loss in the quality and fidelity of the signals or programs carried by the lines. Radio relaying offers similar advantages over cables and wire lines when simplex or multiplex signals are to be transmitted across rivers, bays and other bodies of water and over mountains, deserts and other difficult terrain.

When relaying with very short waves having frequencies of the order of, for example, 3000 megacycles per second the distance of transmission is limited principally by the curvature of the earth since the short radio waves tend to act like light waves and travel in straight lines without useful refraction or reflection from the Heaviside layer as is the case with longer waves. This necessitates the use of relays spaced about twenty or thirty miles apart depending upon such things as the height of the supporting structure available for the transmitting and receiving antennas. For a trans-continental radio relay employing ultra short waves it may be necessary, therefore, to use over one hundred relaying stations. Hence, it is desirable that each relay introduce a minimum of noise and in the case of multiplexing upon a common radio frequency carrier cross-modulation and distortion must also be kept to a very low value at each relay point. Otherwise the integrated effect of the noise and distortion introduced at the relay points will be such as to make the signal received at the ultimate receiving terminal unsatisfactory and in some cases unuseable.

In the case of multiplex signals the received waves at each relay station could be demodulated to their original signalling frequencies and then used to remodulate a new carrier. The latter would then be transmitted on to the next station.

This arrangement is objectionable since each demodulation and remodulation process is carried on with tubes having characteristics which are inherently non-linear and the integrated effect over a chain of relays would be to cause serious distortion and cross-modulation. Also, it has been proposed to heterodyne the received waves at each relay station to some convenient intermediate frequency and then after amplification to heterodyne the intermediate frequency back to some suitable high frequency for retransmittal without transforming the received waves into the original relatively low modulating frequencies. This arrangement, however, suffers from the disadvantage that the heterodyning process used to produce the new frequency for transmittal is relatively inefficient and undue care must be exercised in shielding the local oscillators and frequency multipliers and other circuits associated therewith to avoid undesired heterodyning actions with the received signal.

One of the principal purposes of my present invention is to provide an improved relaying system and apparatus in which distortion and cross-modulation are kept to very low values. To this end I make use of a double angle modulated wave. By angle modulation I mean that type of modulation wherein a characteristic of a continuous wave other than its amplitude is varied in accordance with a signal. More specifically, the angle modulation may be pure frequency modulation or pure phase modulation or a type of modulation having both components. By double angle modulation is meant a system in which one or more signaling channels are used to angle, frequency or phase modulate a common sub-carrier frequency and this common modulated frequency is then employed to angle, frequency or phase modulate a wave of still higher frequency of a value suitable for radio transmission.

I have found that double angle or double frequency modulation is inferior to the use of a single frequency modulation system occupying the same radio frequency band width or channel, as far as eliminating extraneous and natural noise and disturbances is concerned, other conditions being the same. Nevertheless, despite this inferiority double frequency modulation has certain important advantages when used in a system employing a number of radio relaying stations, particularly in keeping distortion and cross-modulation down. These advantages will be discussed more fully later.

It is known that assuming the same signal modulation frequency band width the signal-to-noise ratio improvement of a singly frequency modulated radio wave over amplitude modulation will be equal to the square root of three multiplied by the deviation ratio. The deviation ratio is defined as the maximum frequency deviation in the frequency modulated waves divided by the highest modulation frequency employed. I have found, in the case of double frequency modulation where the signal band of frequencies is used to frequency modulate a sub-carrier and the sub-carrier in turn is used to frequency modulate the radiated carrier, that the signal-to-noise ratio improvement over an amplitude modulation system in which the signaling band directly amplitude modulates the radiated carrier is equal to 1.23 multipled by the product of the deviation ratios employed in the sub-carrier and in the radiated carrier. Hence, it is clear that double frequency modulation does not have as good a signal-to-noise ratio as single frequency modulation for equal transmitted radio frequency band widths, but despite this disadvantage I have found that double frequency modulation is particularly useful in a radio relaying system employing a number of radio relays. It is for the latter reason that the relaying system described herein makes use of double frequency modulation.

In accordance with my invention, at a relaying station the received doubly angle modulated or doubly frequency modulated wave is received and heterodyned down to some convenient intermediate frequency. The intermediate frequency lies within the radio frequency spectrum. This intermediate frequency is amplified and limited and subjected to a single frequency demodulation. The demodulated waves then correspond in frequency and in angle, frequency or phase deviation with the modulated common sub-carrier wave. This reproduced sub-carrier at the relay point is then used, after further amplification and limiting if desired, to directly frequency modulate a new high frequency carrier having a value in frequency suitable for retransmittal.

The foregoing arrangement, I have found, is effective in minimizing cross-modulation and distortion. My explanation why the foregoing desirable result ensues when using my improved radio relaying system is briefly as follows:

In all systems of modulation, cross-modulation and distortion is caused by one or both of two things, unlinear amplitude characteristics of tubes or circuits and unlinear phase characteristics of circuits. The unlinear tubes or circuits may be in the modulator, demodulator or amplifier circuits in between. The latter includes tubes and circuits employed at the relaying stations.

In the case of amplitude modulation unlinear amplitude characteristics are by far the most important. Systems designed for less than one percent overall distortion at one hundred percent modulation may become quite complicated.

In the case of frequency modulation, circuits and tubes having an unlinear amplitude characteristic in the amplifier circuits between the modulator and demodulator do not cause troublesome distortion. However, the modulator circuit wherein amplitude variations are changed to frequency variations must be linear. Likewise the demodulator circuit must also be linear in order to avoid cross-modulation and distortion.

There is another cause of distortion in the case of angle modulation and specifically frequency modulation systems and that is unlinear phase characteristics of tuned circuits. In the case of a simple signaling system making use of a transmitter and a receiver wherein signals are radiated directly to the receiver from the transmitter, the phase distortion and the cross modulation caused thereby are in general, negligible and of no practical significance. However, in a relay system having a large number of relay stations this cause of distortion may be of primary importance, especially as regards production of undesired cross-modulation.

Consider a frequency modulated signal impressed on a single tuned circuit which is tuned to the carrier frequency. At the carrier frequency the circuit acts as a resistance. However, as the frequency swings lower and higher in frequency, the circuit has some inductive and capacitive reactance. The instantaneous phase of the wave is changed due to this reactance. That is, the current in the resonant circuit changes with respect to the exciting voltage. This is just the same thing as changing the phase of the modulated wave a small amount. This change in phase as the modulated wave swings in frequency about the carrier is, of course, at the same rate as the modulation frequency. If the phase change is linear from the carrier frequency out to the limit of swing, no distortion of the modulation will result. If it is not linear, distortion of the modulation will result.

This distortion may be expressed in radians. In ordinary tuned circuits, the radians of distortion depend upon the ratio of the frequency swing to the band width of the circuit. The percent of cross talk produced in the signal depends on the ratio of the radians of distortion to the angular deviation of the signal.

Phase distortion also causes harmonics of the lower modulating frequencies to fall on or near the higher modulating frequencies, and in a multi-channel system this produces another form of cross-modulation.

In my proposed relay system, assume for the sake of further explanation that the received waves are of a form wherein the signaling channels frequency modulate a sub-carrier of one megacycle and this frequency modulated sub-carrier is used to frequency modulate a radiated carrier having an unmodulated frequency of 3000 megacycles. At my proposed relay station the received waves would be heterodyned down to an intermediate frequency of, for example, 30 megacycles, filtered and amplified. The circuits used here have a band width only slightly wider than the deviation and are used to obtain proper selectivity. This intermediate frequency wave, it will be noted, carries double frequency modulations. Because of the circuits through which the intermediate frequency wave passes, phase distortion of the sub-carrier frequency of one megacycle results. Also, in the frequency modulation discriminator following the intermediate frequency amplifier, distortion of this one megacycle wave results from the unlinear characteristic of the discriminator. These two distortions, however, are on the common sub-carrier frequency of one megacycle but they do not affect the signaling channels carried by the common sub-carrier since the signal channel wave shapes or signal frequency wave shapes or ultimate signal wave shapes depend on the rate of change of the one megacycle sub-carrier and not upon the shape of its amplitude characteristic. If it is desired, the harmonics produced in the one megacycle frequency modulated sub-carrier by phase and other distortions can be eliminated by passing the wave through a one megacycle band pass filter.

A certain amount of filtering in the one megacycle circuits at the relaying station may be desirable, but the filtering circuits must be designed with care as the modulating frequencies of the sub-carrier are the ultimate signaling frequencies and the phase distortion, causing cross-modulation, will result if the phase characteristic is not linear.

The linearity of the modulator modulating the new carrier at the relay of, for example, 3010 megacycles by the sub-carrier of one megacycle is not important. This follows since although distortion is produced it is distortion of the one megacycle sub-carrier but this, again, is not the ultimate signaling frequency or frequencies which are to be kept free of all forms of distortion if exact high quality reproduction is to be had.

Further, it will be noted that these advantages apply only to a double angle modulated system and do not follow in the case of double amplitude modulation since distortion of the amplitude characteristics of the intermediate and sub-carrier waves would appear ultimately in the final signaling frequencies. Comparable reduction for cross-modulation cannot be obtained if the system is used in which the sub-carrier is amplitude modulated by the signal and this sub-carrier is then used to modulate the transmitted wave.

Another advantage of the double angle or double frequency modulated system described above follows from the fact that most of the filtering circuits and amplifier tubes may be placed in the intermediate frequency stages ahead of the discriminator-detector circuits at the relay point. These circuits can be designed to have a band width just sufficient to accommodate the signal and give the required selectivity. In the I. F. filtering and amplifying circuits phase distortion is not important. In this way a minimum of 1000 kc. circuits can be employed following the discriminator-detector circuits. These latter circuits must be carefully designed and have a relatively wide band width, in relation to the swing of the waves conveyed thereby, in order to minimize phase distortion and cross-modulation.

Other objects, advantages and features of my present invention will be apparent as the more detailed description thereof proceeds. Among the features may briefly be mentioned an improved frequency modulating system in which exceptionally good linearity is secured, thereby enabling multiplexing at the transmitting terminal with negligible cross-modulation and an arrangement of circuits at receiving points such that high sensitivity is obtained at certain points wherein non-linear characteristics do not affect the ultimate signal wherein extreme linearity at the expense of sensitivity is employed in other portions of the system whereby the loss in sensitivity is more than compensated for by freedom from cross-modulation and other distortion effects. For example, in one portion of the receiving apparatus wherein a swing of plus and minus 170 kc. may represent the maximum frequency swing of a group of multiplexed signals, the discriminator or sloping filters used to convert this wave into waves of varying amplitude prior to detection may have overlapping resonance curves, the separation between the peaks of which may be of the order of plus and minus two million cycles. This means that the waves are being converted to waves of varying amplitude over a very small fraction of the characteristic of the circuit, thus insuring high linearity in the transformation.

In the detailed description which follows and which is given in connection with the accompanying drawings certain values of frequency have been chosen for various carriers, channels, etc. It is to be clearly understood that these values have been chosen so as to present a typical example which may be followed, but obviously widely different choices as to frequency and other values may be made. Hence, the invention is not to be considered as limited to the values chosen for illustrative purposes.

In the accompanying drawings Figure 1 illustrates schematically a transmitting terminal for an ultra high frequency relay system. The terminal makes use of a high quality voice channel having, as indicated, an upper frequency of 10,000 cylces although if desired this may be raised to 15,000 cycles and several other signaling channels which are transmitted to a common amplifier as side bands of suitable sub-carriers. All of the signals are combined, pre-emphasized in a suitable network and used to frequency modulate a common sub-carrier having, as illustrated, a mean frequency of one megacycle. The latter, in turn, is used to frequency modulate a transmitted carrier having a mean frequency of 3000 megacycles.

Figure 2 is a block diagram of a typical relay station employing the principles of my present invention. It will be noted that the received doubly modulated waves are converted to a suitable intermediate frequency, amplified, and then subjected to a single frequency demodulation. The waves resulting from this single frequency demodulation are then used in part for purposes of automatic frequency control of the local beating oscillator and principally to frequency modulate a new locally generated carrier.

Figure 3 is a block diagram of a receiving terminal. This terminal may receive waves transmitted directly from the apparatus of Figure 1 or from a relaying point or station such as diagrammatically illustrated in Figure 2. In the receiving system of Figure 3 the received waves are first converted to a suitable intermediate frequency, amplified, and then subjected to a first frequency demodulation by a discriminator system having relatively high sensitivity. The linearity of this first discriminator-detector is not of particular importance as regards introduction of cross-modulation. This, of course, is equally true of the discriminator-detector system at the relaying points, as will be clear from explanations to be given later. These may therefore have a band width only wide enough to accommodate the signal and can therefore give the required selectivity. The second discriminator-detector of the receiver of Figure 3 has low sensitivity, but is made extremely linear in order to minimize cross-modulation. The output of the second discriminator-detector is fed through a de-emphasizing network and through suitable amplifiers and filters to ultimate signal utilization channels.

Figure 4 is a wiring diagram of circuits utilizing the combined channels of Figure 1 to produce a common frequency modulated sub-carrier. In order to secure linearity at this critical point a pair of oppositely frequency modulated oscillators are used which are operated over a relatively small range. The outputs of the oscillators are frequency multiplied and combined in a converter in order to produce a sub-carrier of proper mean frequency and desired frequency swing.

Figure 7 also illustrates circuits for automatically frequency controlling the first beating oscillator.

Figure 7:
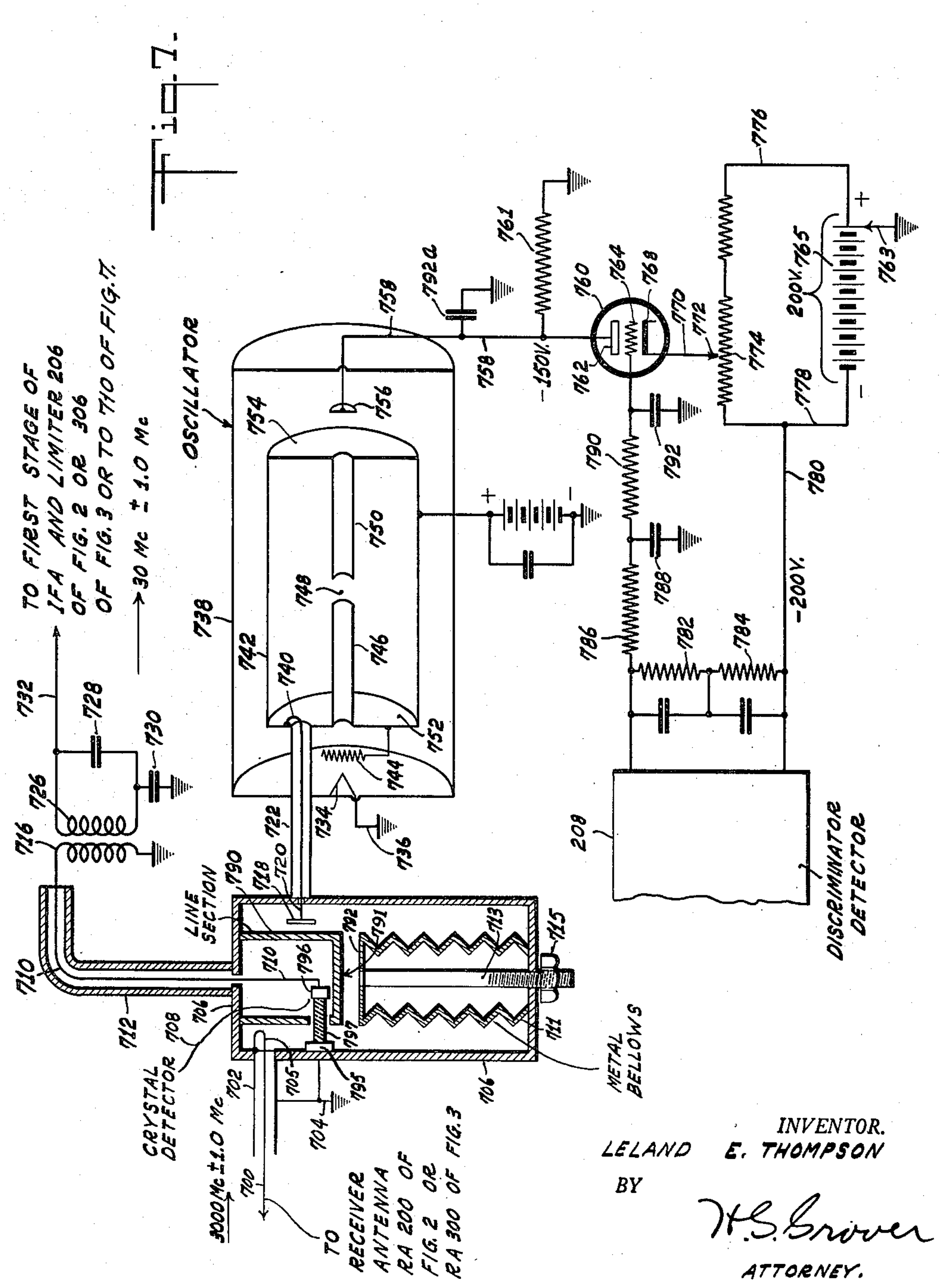
Figure 7 is a more detailed schematic diagram of the first local oscillator and converter employed at a relaying point or at the terminal receiver.
Figure 7A:
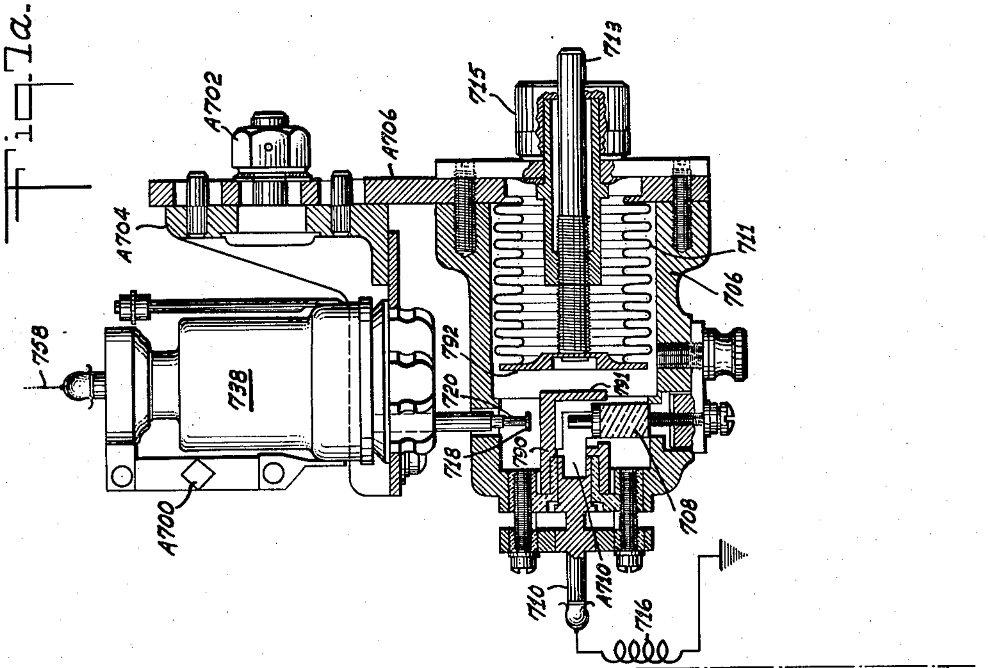

Figure 7*a* is a more detailed showing of a suitable arrangement of parts for the local oscillator, converter and first detector of Figure 7.

Figures 7B, 8C:
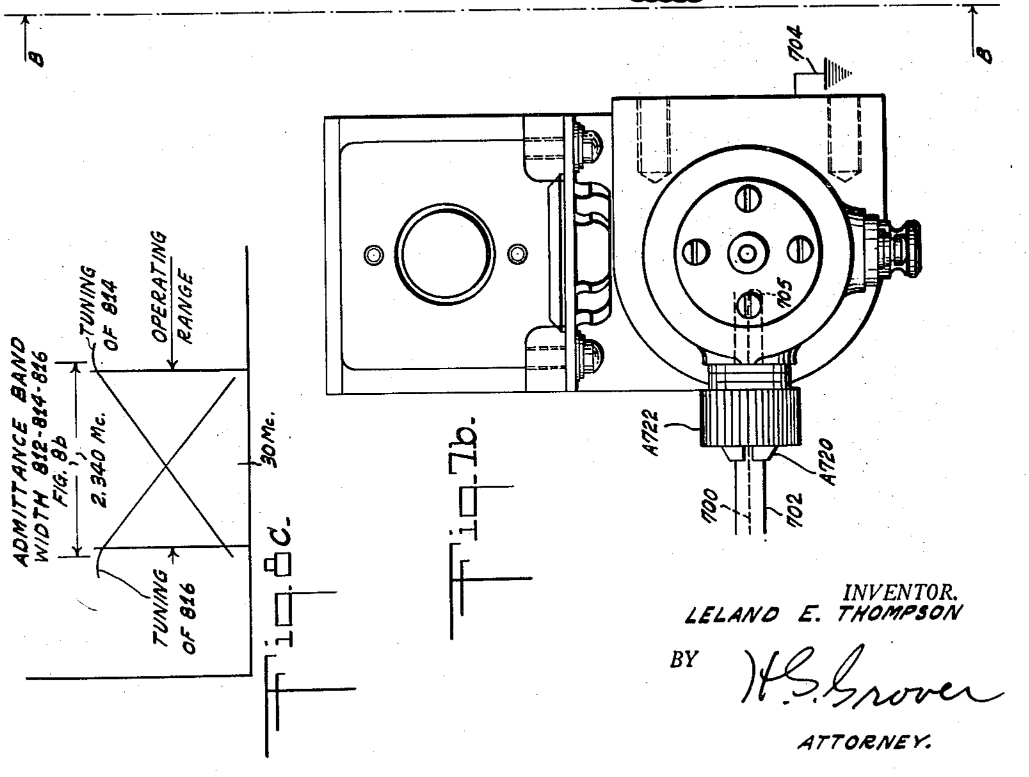

Figure 7*b* is a side view of the apparatus shown in Figure 7*a*.

Figure 8 is composed of Figures 8*a* and 8*b* which are to be read as joined along the line X—X so that the conductors A to L inclusive are respectively connected together.

Figure 2:
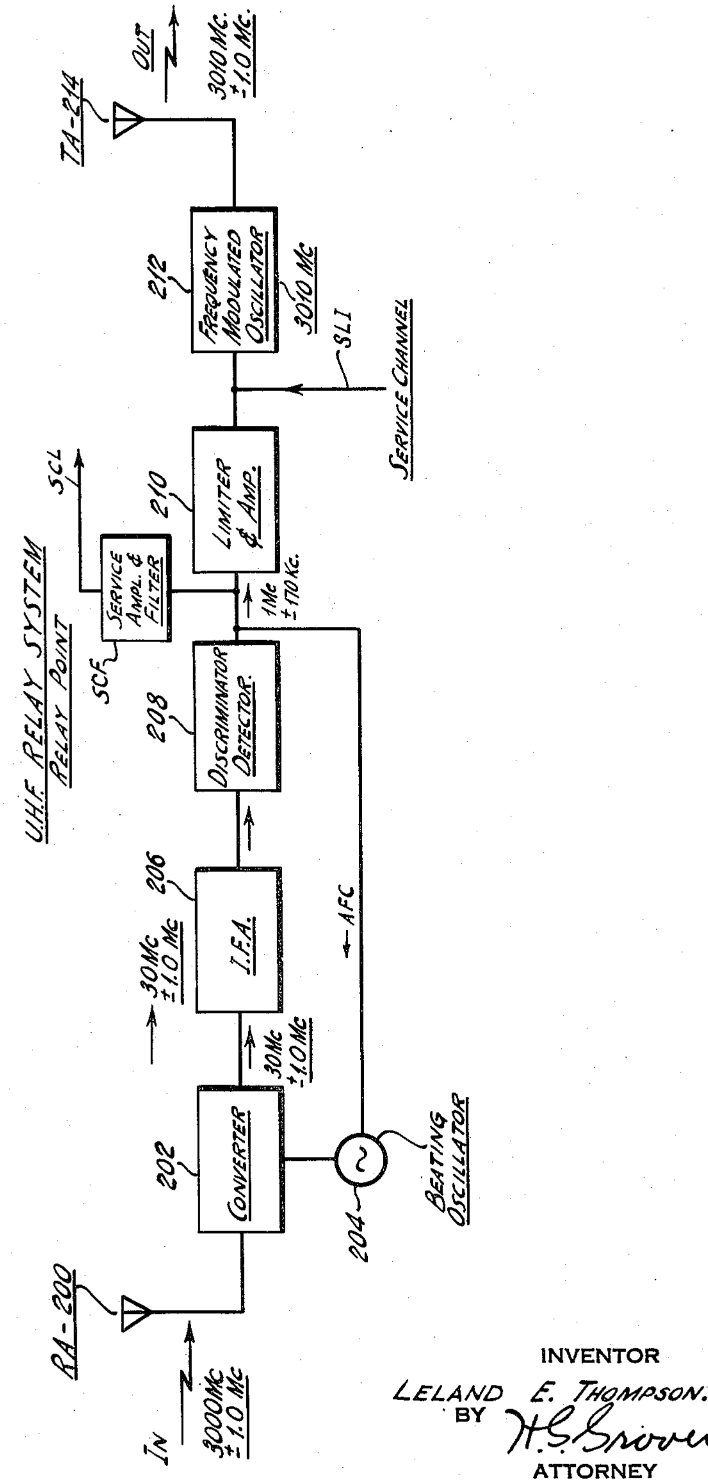
Figure 3:
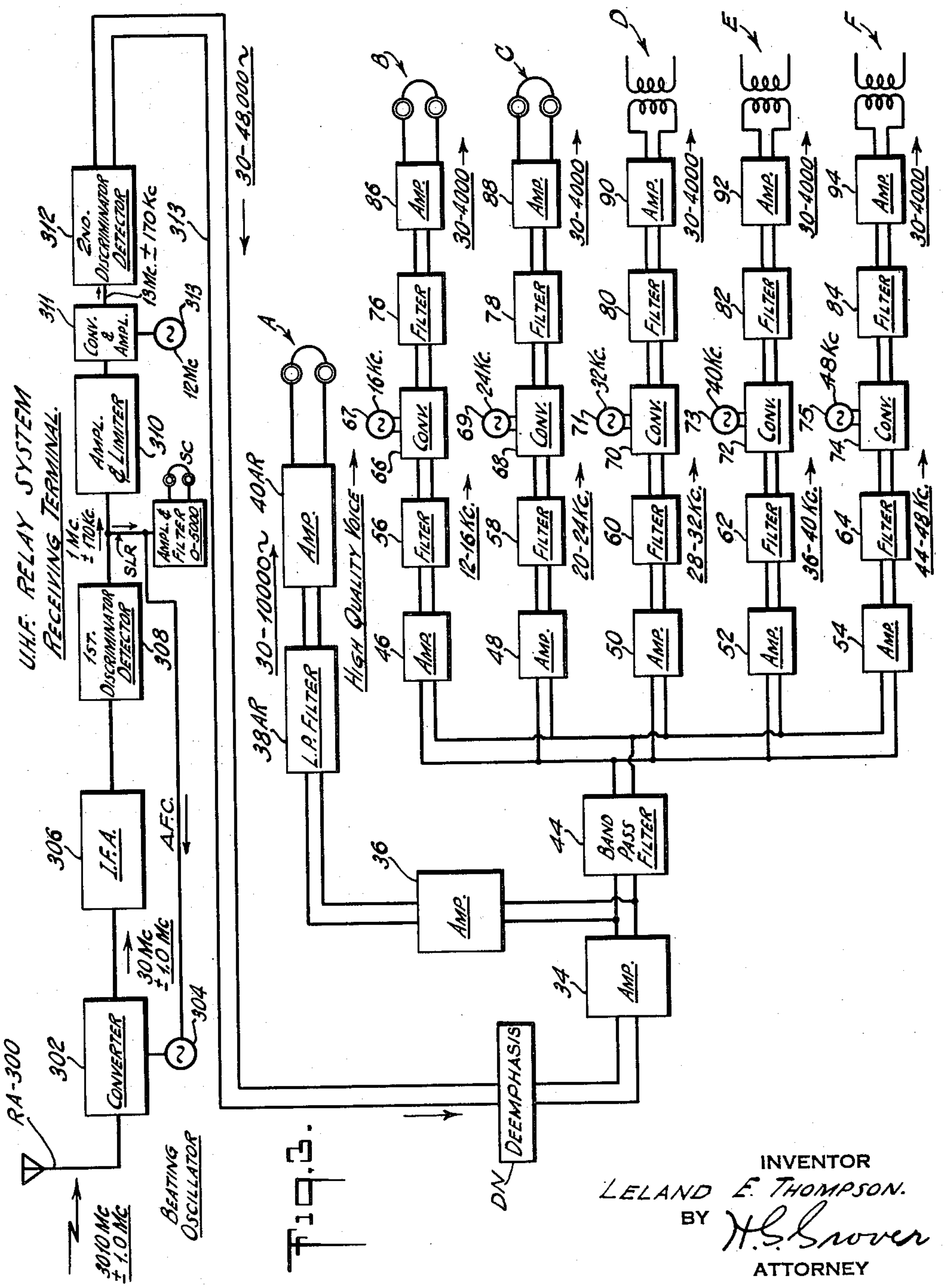

Figure 8*a* is a wiring diagram of intermediate frequency amplifiers and limiters which may be used following the converters 202 and 302 of Figure 2 and Figure 3 respectively.

Figure 8*b* is a wiring diagram of the first discriminator-detector illustrated at 208 in Figure 2 and 308 in Figure 3. Figure 8*b* also illustrates apparatus for indicating breakdown in the relaying system.

Figure 9:
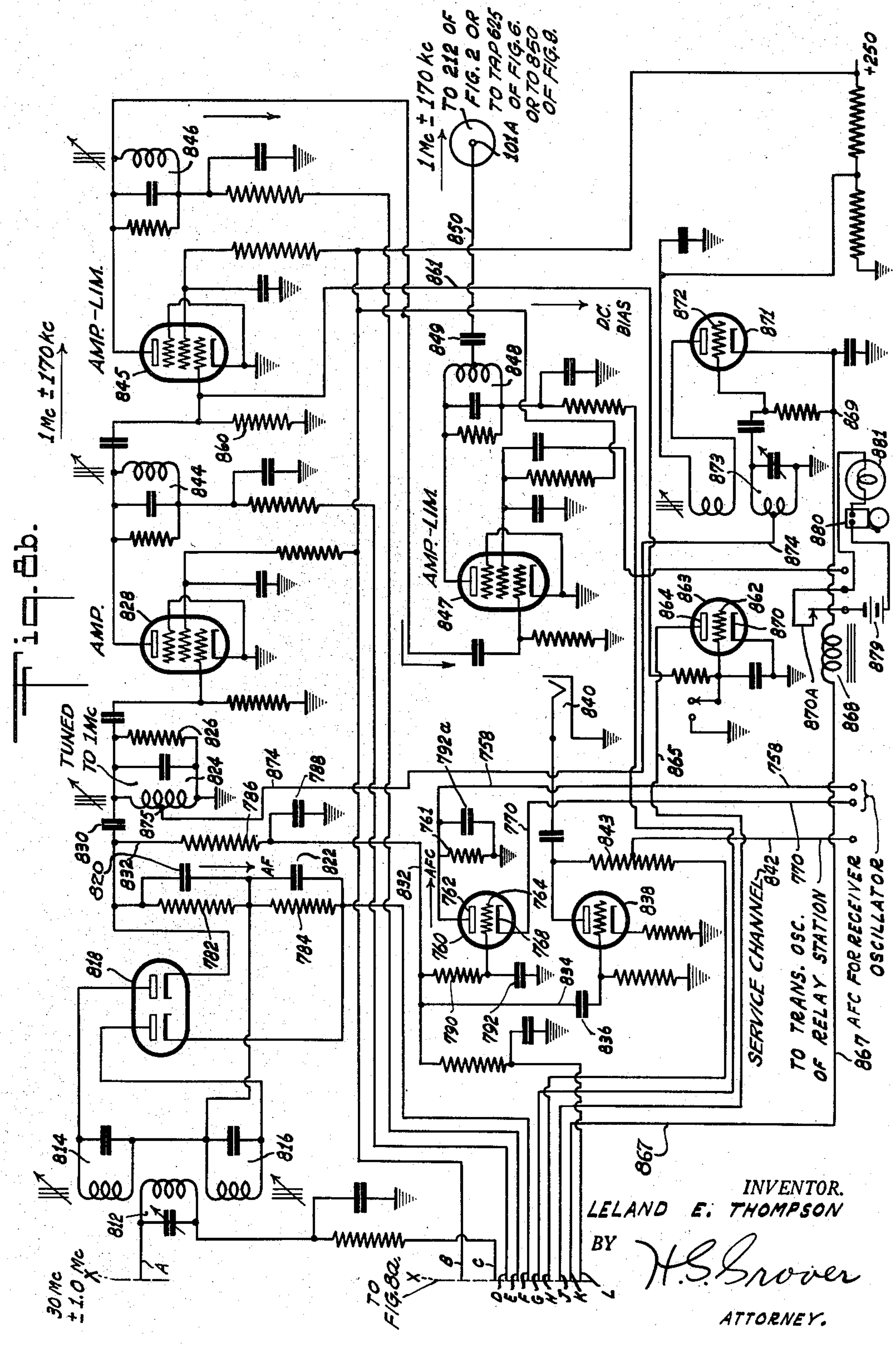
Figure 9:
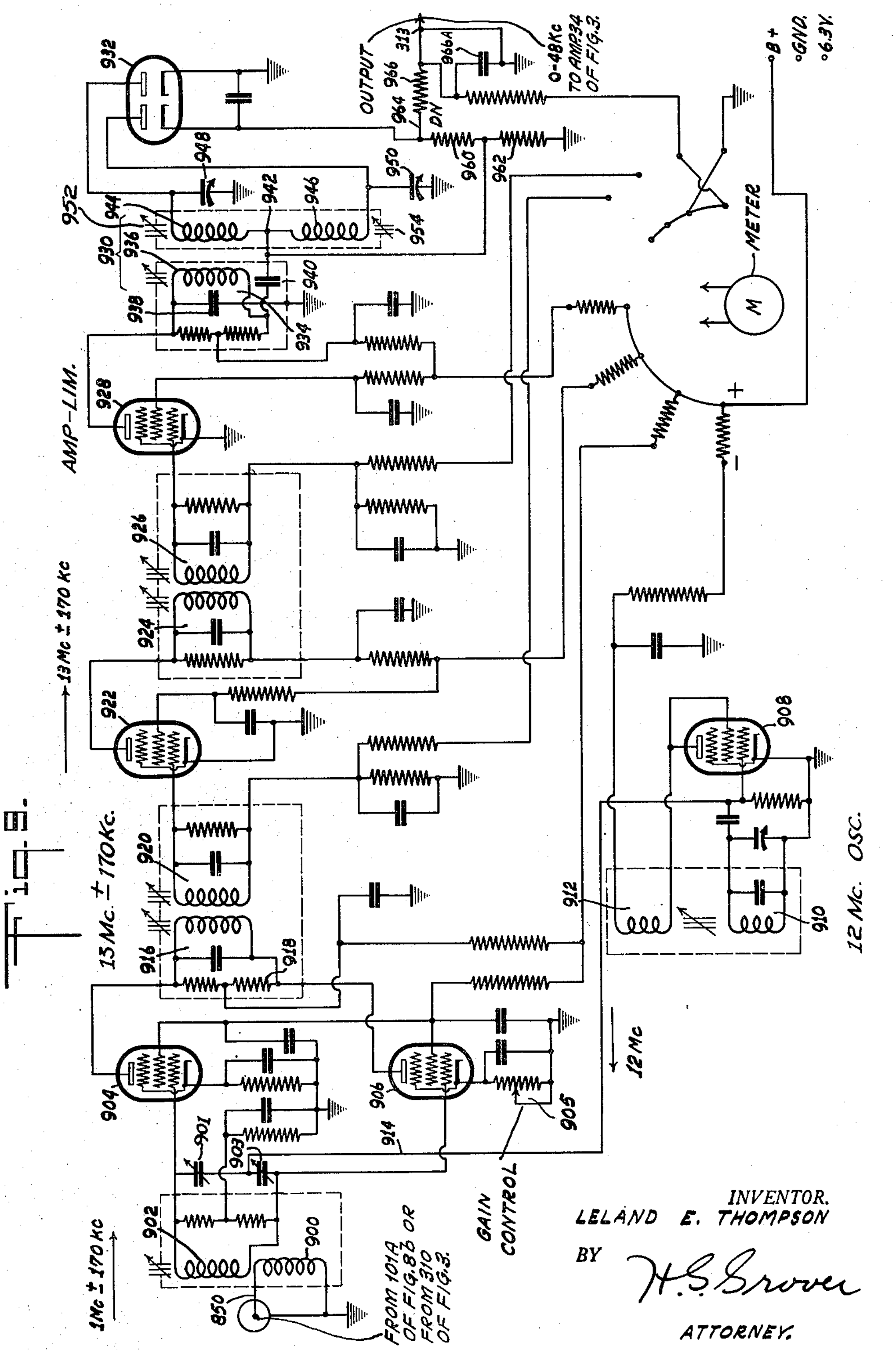

Figure 9 is a wiring diagram of apparatus which may be used for the oscillator 313, converter and amplifier 311 of Figure 3 and also for the second discriminator-detector 312 of Figure 3.

Figures 9A, 10:
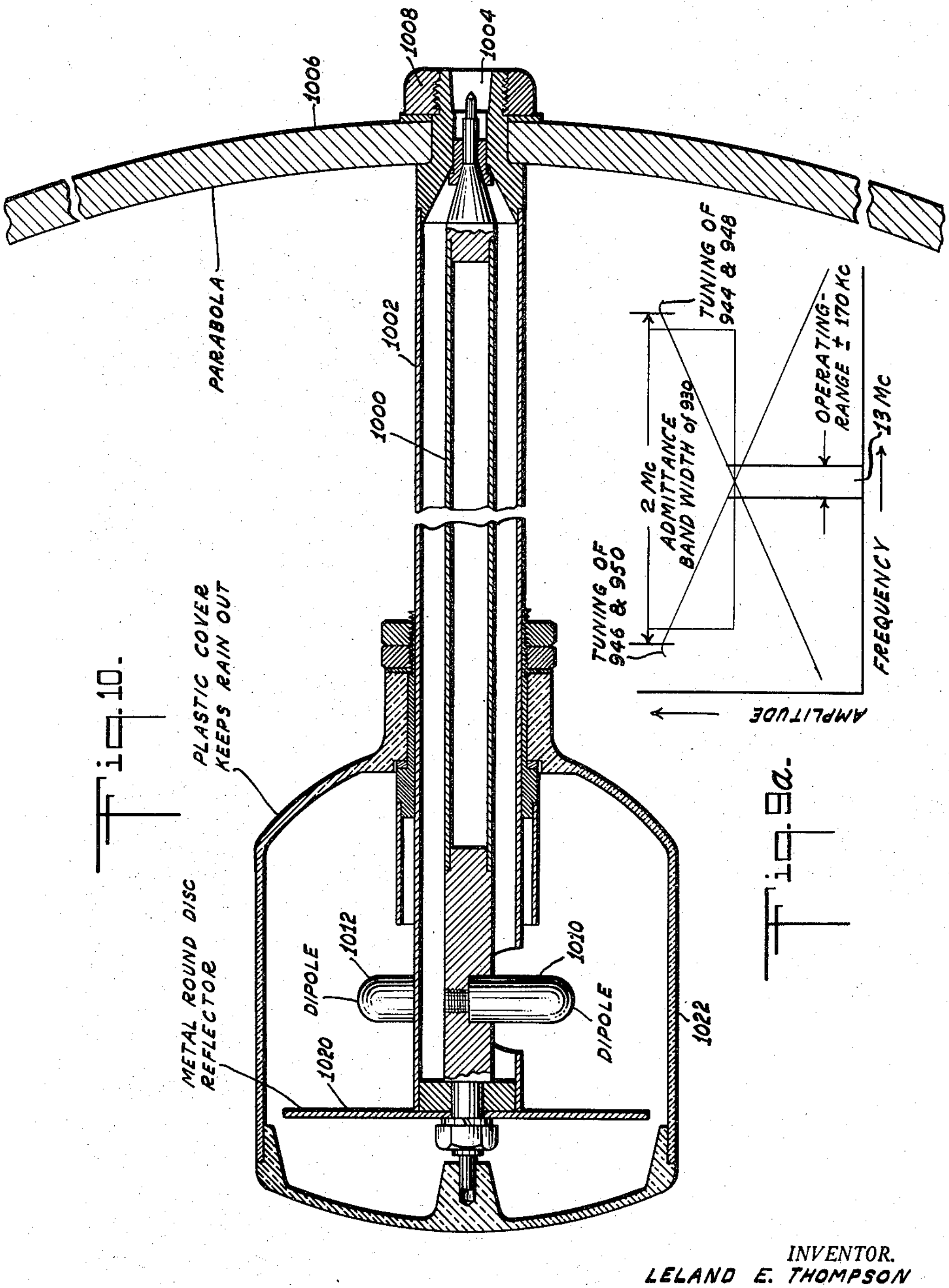

Figure 9*a* illustrates the frequency characteristics of the discriminator circuits 930 of Figure 9; and Figure 10 illustrates a typical antenna system which may be employed as a transmitting or receiving antenna at any point in the system where such antennae are required.

Figure 1:
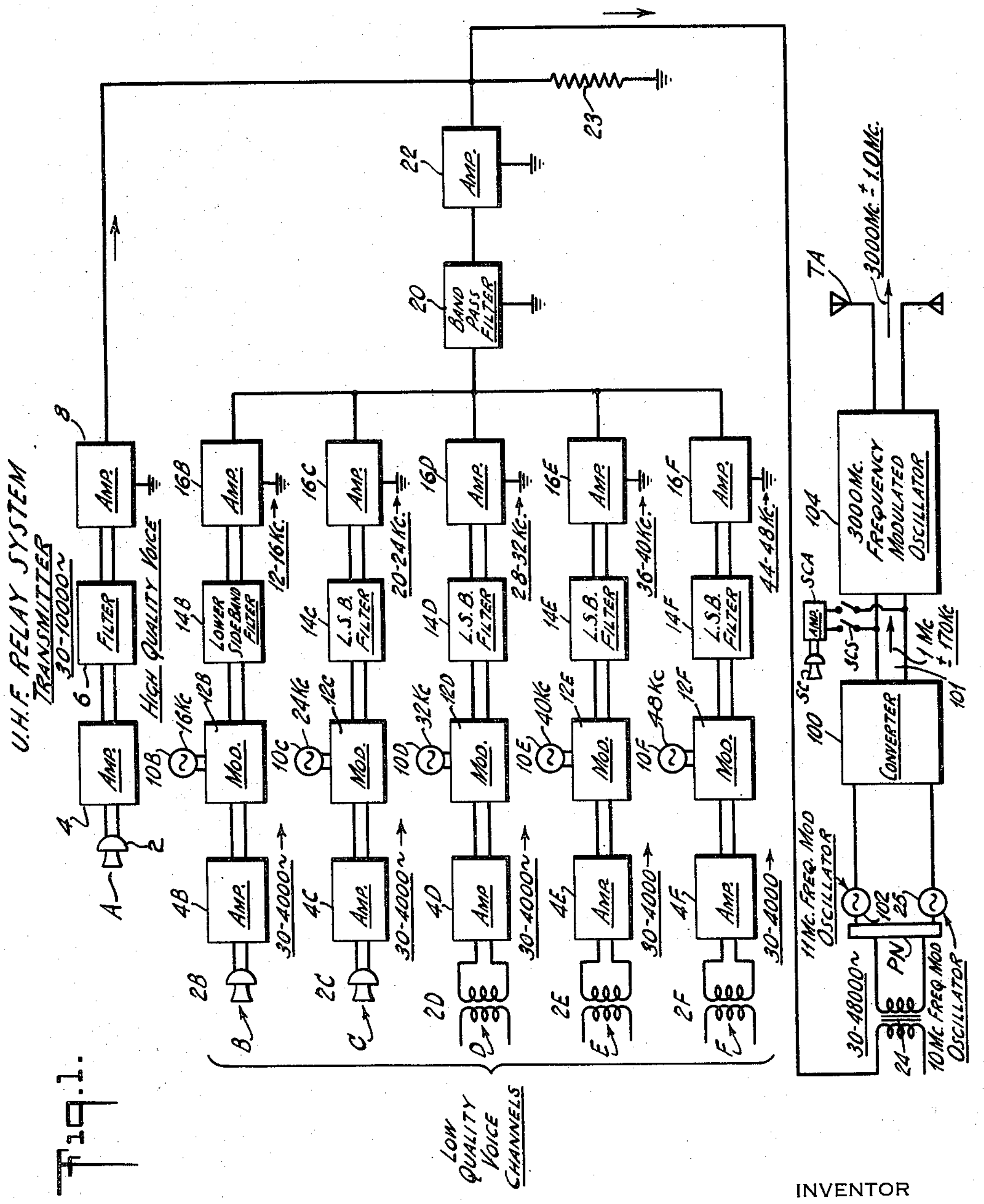

In Figure 1, several independent signaling channels are combined and modulate the waves radiated from the transmitting antenna TA to the receiving antenna RA200 of the relay station of Figure 2. The waves received at the relay station are heterodyned, amplified, detected and used to modulate a different carrier frequency wave. The latter is radiated over the relay transmitting antenna TA214 to the receiving antenna RA300 of Figure 3. The received waves at the receiving terminal are amplified, translated and separated into signals corresponding to those originally transmitted.

Turning more specifically to Figure 1, the signal channels are designated by the letters A to F, inclusive. These channels, which will be described in greater detail later, are combined in resistor 23 and fed through transformer 24 and pre-emphasizing network PN to oppositely frequency modulate oscillators 25 and 102. Network PN is described more fully later in connection with Figs. 4 and 5.

Oscillator 25 may operate, by way of example, at an unmodulated frequency of 10 megacycles and oscillator 102, for example, at an unmodulated frequency of 11 megacycles. The outputs of the two oscillators 25 and 102 are combined in the converter 100 as a result of which the frequency modulation appearing in the peak frequency output of converter 100 is equal to the sum of the deviations of the oscillators 25 and 102 when they are caused to separate in frequency. In a modification, which will be described later, the outputs of oscillators 25 and 102 are frequency multiplied before being combined in converter 100.

It will therefore be apparent that each oscillator, in the arrangement of Figure 1, need swing only half as far as would be the case if only one oscillator were used to produce a given amount of frequency modulation. As a consequence, distortion is reduced since the working range of the oscillators is made smaller and over the smaller range they can be made more linear in action. Cross-modulation between channels is therefore greatly reduced. Furthermore, such an arrangement serves to reduce hum due to filament heating or ripple in the plate voltage supply.

Each of the channels A to F, inclusive, is adjusted in amplitude so that the deviation ratio for the frequency modulation produced by each channel in the output of converter 100 is unity, but the total maximum swing produced by all of the channels is plus and minus 170 kilocycles as indicated in the drawing. In other words, channel A produces a maximum swing of 10 kilocycles in the output of converter 100, channel B a maximum of 16 kilocycles, channel C 24 kilocycles, etc. When all of the channels are of maximum amplitude and producing maximum frequency deviation and, also, when all of the signals are instantaneously additive, the output of converter 100 is then being modulated plus and minus 170 kilocycles. The foregoing adjustment and operation are provided by use of the pre-emphasizing network PN, as a result of which the signalling channels have substantially the same signal-to-noise ratio—a desirable feature in multiplex signalling.

The frequency modulated output of the converter 100 is a beat of one megacycle plus and minus 170 kilocycles and is used to frequency modulate a second frequency modulated oscillator 104 whose mean unmodulated frequency is 3000 megacycles.

As a result the wave radiated over the transmitting antenna TA of Figure 1 is a 3000 megacycle carrier having a maximum deviation of plus and minus 1.0 megacycle. A greater deviation ratio for the waves modulated in frequency modulator 104 may be used if desired so that the transmitted wave would be of the order of 3000 megacycles plus and minus two or four megacycles.

More specifically, with reference to the channels A to F, inclusive, channel A is a high quality voice channel containing all frequencies in the band from 30 to 10,000 cycles.

The high quality voice signal is picked up by microphone 2, amplified by amplifier 4 and sent through filter 6 and another amplifier 8 to the combining resistor 23.

Channels B to F, inclusive, are low quality voice channels each passing through the first amplifiers 4B, 4C, 4D, 4E and 4F, different voice signals lying in the band from 30 to 4000 cycles. These amplified signals are fed to the modulators 12B to 12F, inclusive, supplied with oscillations from separate oscillators 10B to 10F, inclusive.

The output of the modulator 12B is fed through a filter 14B which passes only the lower side band. Similarly, filters 14C to 14F, inclusive, pass only the lower side bands produced, respectively, in modulators 12C to 12F, inclusive. In the case of filter 14B, the band of frequencies passed on to amplifier 16B occupies the range from 12 to 16 kilocycles.

Similarly, the lower side band filters 14C to 14F, inclusive, pass on to amplifiers 16C to 16F, inclusive, the lower side bands derived from the immediately preceding modulators 12C to 12F, inclusive. The frequency band passed by each side band filter is indicated in Figure 1. Thus 14C passes 20–24 kilocycles, etc.

The outputs of the lower side band amplifiers 16B to 16F, inclusive are combined as indicated and fed through a band pass filter 20 to amplifier 22, which is made as linear as possible to prevent cross-modulation between channels. The output of amplifier 22 is combined with the output of the high quality channel from amplifier 8 in resistor 23.

The resulting voltage across resistor 23 occupies a band of frequencies from 30 to 48,000 cycles and this band is fed through transformer 24 to the oppositely frequency modulated oscillators 25 and 102 having, respectively, unmodulated carrier frequencies of ten and eleven megacycles. The amplitude of the voltages fed from each channel is adjusted, as will be more fully explained later, so that each channel produces frequency modulation in the output of converter 100 with a deviation ratio of unity. Thus, channel A having an upper frequency of 10,000 cycles deviates the output of converter 100 an amount of plus and minus 10,000 cycles. Similarly, the maximum amplitude of voltage fed through channel B to resistor 23 produces a deviation of plus and minus 16 kilocycles and, similarly, for maximum amplitude of input channels C, D, E and F produces, respectively, deviations of plus and minus 24 kilocycles, plus and minus 32 kilocycles, plus and minus 40 kilocycles and plus and minus 48 kilocycles. When all of the channels are fully modulated and when they are all additive or instantaneously in phase and of the same polarity, the beat between oscillators 25 and 102 appearing in the output of converter 100 is deviated a maximum of plus and minus 170 kilocycles.

The frequency modulated output of 100, namely, a difference frequency of one megacycle, plus and minus 170 kilocycles is picked off and used to frequency modulate the second frequency modulated oscillator 104 operating at an unmodulated carrier frequency of 3000 megacycles.

The deviation ratio of the modulated waves appearing in the output circuit of the second frequency modulated oscillator 104 is unity or more, as desired, as a result of which the waves radiated over the transmitting antenna TA have for maximum deviation, a frequency of 3000 megacycles plus and minus 1.0 megacycle. A larger deviation ratio may be used, in which case the radiated waves would be, for example, 3000 megacycles plus and minus 2, 3, or more megacycles when fully modulated.

The waves radiated from the transmitting antenna TA of Figure 1 may be received directly by the receiving apparatus of Figure 3. Ordinarily, however, such waves would be radiated to the receiving terminal by way of one or more relaying points, such as illustrated in Figure 2. The waves would be received at the relay point at one frequency and re-transmitted to the next point in the system at some different frequency so as to avoid feed-back or "singing" at the relay station.

In the relaying system illustrated in Figure 2, the waves are picked up or received on a receiving antenna RA200. The received waves are beat down in frequency in a converter circuit 202 with waves from a local beating oscillator 204. The intermediate frequency produced may be 30 megacycles plus and minus 1.0 megacycle. The waves of intermediate frequency are amplified in an intermediate frequency amplifier 206 and then fed to a discriminator detector 208.

The action of the discriminator detector is such as to produce a wave of one megacycle plus and minus 170 kilocycles corresponding to the output of the converter 100 of Figure 1. This wave is limited and amplified in appropriate apparatus 210 and then used to frequency modulate oscillator 212 whose unmodulated frequency may be 3010 megacycles.

By adjusting the amplitude of the output of amplifier 210 the waves radiated over the transmitting antenna TA214 of the relay point of Figure 2 may be made 3010 megacycles plus and minus 1.0 megacycle.

The relay system as described in connection with Figure 2 has definite practical advantages over an arrangement wherein the received waves are demodulated down to the original signals and the latter are used to remodulate a newly generated local wave. It will be noted that reproduction of the original signaling waves and amplification of the same in a common amplifier, prior to their use for remodulation of a newly generated carrier, will introduce undesirable cross-modulation. This follows from the fact that the process of demodulation and amplification in a common amplifier takes place with apparatus having non-linear characteristics and it is these non-linear characteristics which cause the cross-modulation difficulties. However, even with non-linear demodulator and modulator circuits and apparatus, the relaying system of Figure 2 will not introduce cross-modulation. It is to be noted that in the system of Figure 2 the intermediate frequency amplifier 206 may also be provided with a limiter.

The waves radiated from the transmitting antenna TA214 of the relay point of Figure 2 are received on the receiving antenna RA300 of the U. H. F. relay system receiving terminal illustrated in Figure 3. These waves are heterodyned with waves from a local beating oscillator 304 in a converter 302 to produce an intermediate frequency of thirty megacycles plus and minus 1.0 megacycle. These waves of intermediate frequency are amplified in the intermediate frequency amplifier 306 and then fed to a first discriminator detector 308. As before explained, a high degree of amplification is secured with amplifier 306.

The output of the first discriminator detector 308 is the one megacycle plus and minus 170 kilocycle wave corresponding to the output of the converter 100 of Figure 1. The output of the first discriminator detector 308 of Figure 3 is then amplified and limited in amplifier limiter 310. Hence, it will be observed that the forward portion of the apparatus of Figure 3 from RA300 to the limiter 310 is substantially identical to the apparatus between RA200 and limiter 219 of Figure 2, as a result of which economy in the design and flexibility in the use of the apparatus are secured.

The output of the amplifier limiter 310 of Figure 3 is fed to a converter 311 supplied also with oscillations of a frequency of, for example, twelve megacycles from oscillator 313. The upper beat of converter 311 is fed to discriminator detector 312, in the output leads 313 of which appear a band of frequencies from and including 30 to 48,000 cycles corresponding to the band of frequencies fed through transformer 24 of Figure 1 to the frequency modulated oscillators 25 and 102.

Of this band of frequencies filter 38AR, to which the band is fed through amplifiers 34, 36, passes the high quality voice channel A containing waves lying in the band of 30 to 10,000 cycles. These waves are amplified in the amplifier 40AR and fed to a loudspeaker or earphones A. The other frequencies corresponding to the lower side bands of channels B to F inclusive of Figure 1 and occupying the band from 12 to 48 kilocycles are fed through band pass filter 44 and amplifiers 46 to 54 inclusive to the filters 56 to 64 inclusive.

Filters 56 to 64 inclusive pass bands of frequencies as indicated in Figure 3, namely, filter 56 passes 12 to 16 kilocycles, filter 58 passes 20 to 24 kilocycles, filter 60 passes 28 to 32 kilocycles, filter 62 passes 36 to 40 kilocycles and filter 64 passes 44 to 48 kilocycles. The outputs of filters 56 to 64 are combined in the converters 66 to 74 with oscillations from local oscillators 67, 69, 71, 73 and 75 operating, respectively, at 16 kilocycles, 24 kilocycles, 32 kilocycles, 40 kilocycles and 48 kilocycles. Each of the filters 76 to 84 is designed to pass a band of frequencies from 30 to 4000 cycles, as a result of which in the amplifiers 86 to 94 inclusive the originally transmitted signals A to F inclusive appear. These waves are individually translated, as indicated, by the earphones B, C, etc.

Also it is to be noted that all of the channels need not be voice channels, but, if desired, some of them may be telegraph channels, some voice and some of other types, such as facsimile and teletype channels. Thus, as a possible alternative channel A may be replaced by twelve telegraph channels, the separate telegraph carrier tones of which may occupy the band from 465 to 2295 cycles, each tone channel having a width of 170 cycles. Thus, the first telegraph channel may be designed for a tone carrier of 465 cycles with a signalling width of plus and minus 85 cycles, the second tone channel may use a tone carrier of 595 cycles with a cycle width of plus and minus 85 cycles, etc.

In addition to channels A–F inclusive, of Figure 1, a service channel SC may be provided. The output of the service channel pick-up microphone may be amplified by the service channel amplifier SCA and switched directly, by means of switch SCS, to frequency modulate oscillator 104. Preferably, amplifier SCA passes a band of approximately 0–5000 cycles and the amplitude of the modulating voltages is adjusted so as to produce, for example, a maximum swing of ±15,000 cycles in the output of oscillator 104.

As indicated in Figure 2 the service channel band may be filtered out by filter SCF and taken from line SCL for use in earphones, or the output of line SCL may be fed by patch cords to the service line input SLI to modulate oscillator 212.

In Figure 3 the service band of frequencies may be taken directly from the output of the first discriminator detector 308 through line SLR and utilized as found desirable.

Figure 4:
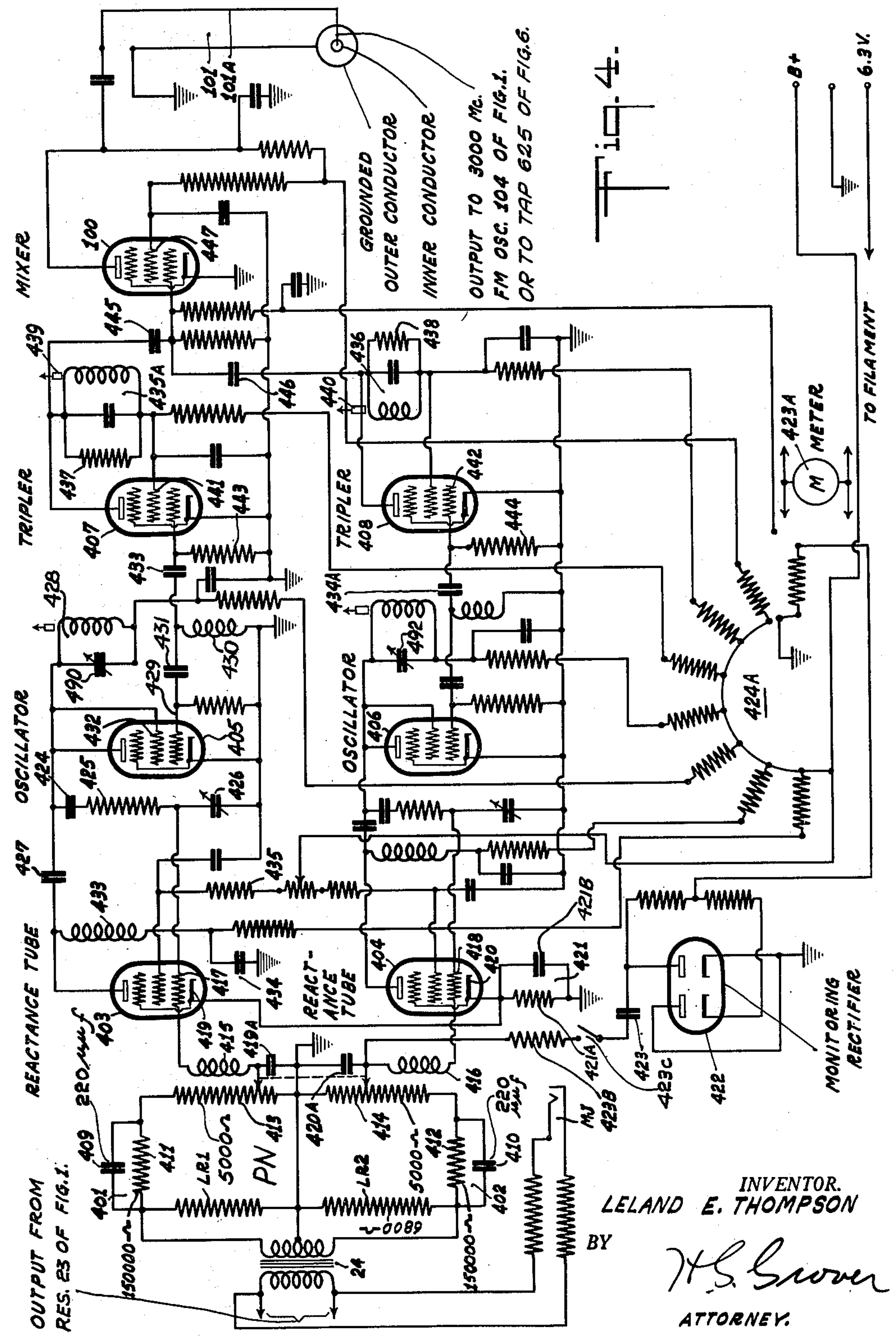

Figure 4 is a wiring diagram of a preferred form of apparatus between transformer 24 and the 3000 megacycle frequency modulated oscillator 104 of Figure 1. Figure 4, in other words, illustrates in greater detail the frequency modulated oscillators 25 and 102 and converter 100 of Figure 1. Specifically, in Figure 4 the wave band representing channels A to F inclusive and running from 30 cycles to 48 kilocycles is fed through the secondary of transformer 24, pre-emphasis networks 401, 402 to oppositely control the conductivities of reactance tubes 403, 404. The reactance tubes oppositely vary the frequencies of oscillators 405, 406 which, by way of example, in the no signal condition may be set to run at frequencies of, respectively, 8.5 and 8.83 megacycles. Hence, when oscillator 405 increases in frequency, oscillator 406 decreases in frequency and vice versa.

The output of frequency modulated oscillator 405 is fed to a frequency tripler 407 and the output of frequency modulated oscillator 406 is fed to a frequency tripler 408. The outputs of the two triplers 407 and 408 having unmodulated frequencies of 25.5 and 26.5 megacycles are combined in the converter or mixer 100, corresponding to the converter 100 of Figure 1, to produce an unmodulated sub-carrier of one megacycle. The latter is fed through the output leads 101 to the 3000 megacycle, frequency modulated oscillator 104 of Figure 1.

It should therefore be clear that the oscillator digrammatically shown at 102 in Figure 1 includes oscillator 405, reactance tube 403 and tripler 407 of Figure 4. Also schematically shown oscillator 25 of Figure 1 includes oscillator 406, reactance tube 404 and tripler 408 of Figure 4.

Figures 5, 6, 6A, 6B:
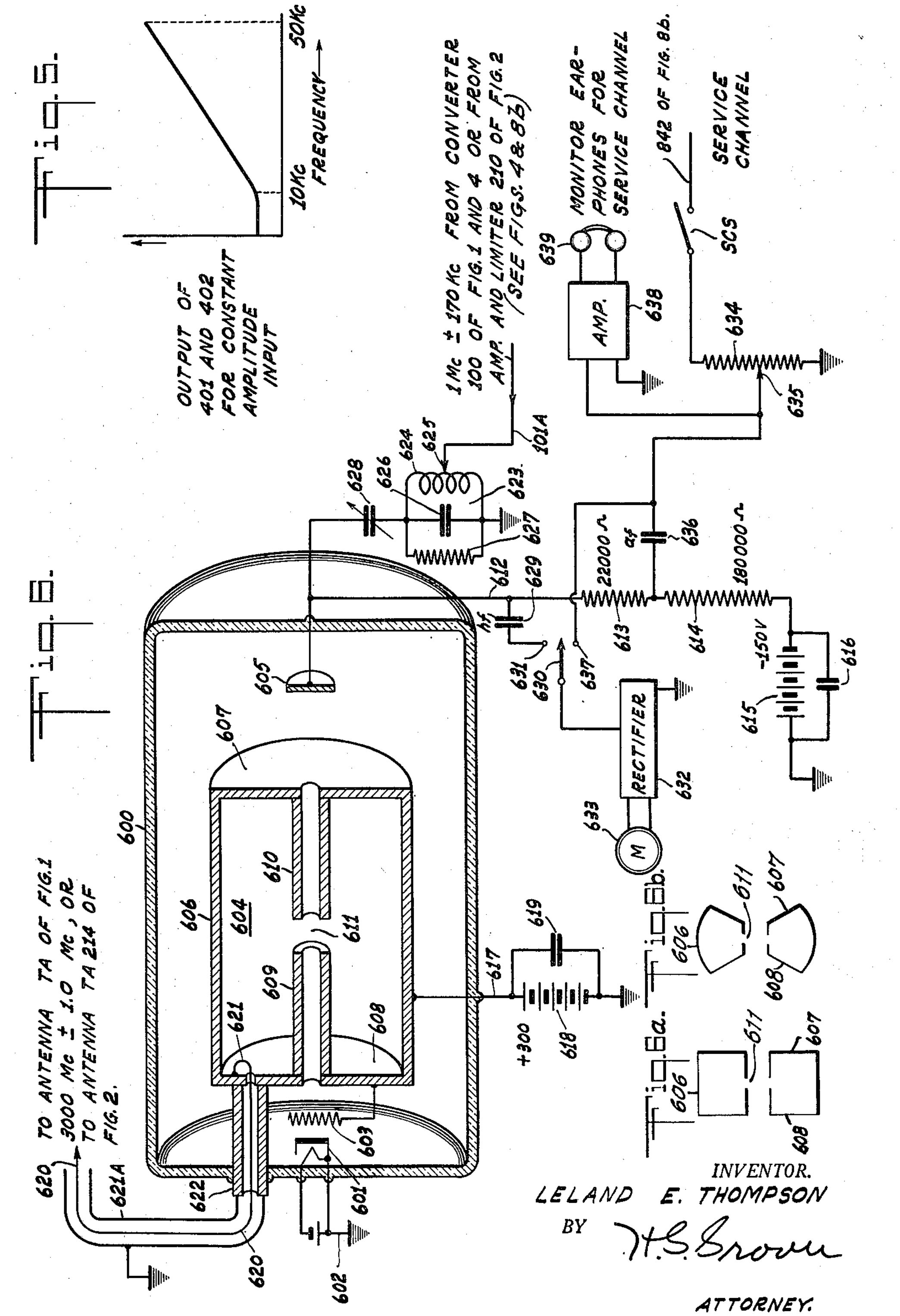
Figure 5 illustrates the characteristic of the pre-emphasizing network used in the apparatus of Figures 1 and 4.
Figure 6 is a schematic showing of a high frequency oscillator and circuits therefor for utilizing the frequency modulated sub-carrier produced by the apparatus of Figure 4 for frequency modulating a very high frequency carrier which is to be radiated directly to a receiving terminal or to a relay station such as illustrated in Figure 2.

To go into greater detail concerning Figure 4, a monitoring jack MJ, for monitoring purposes, is connected to the primary of transformer 24. The secondary of the transformer is shunted by loading resistors LR1 and LR2. The pre-emphasis networks 401, 402 are composed of condensers 409, 410 having a value of 220 mmf. each connected in shunt to resistors 411, 412 each having a resistance of 150,000 ohms. As a consequence, the pre-emphasis networks will be found to have a characteristic which is substantially flat over the range from approximately zero to 10,000 cycles and then rises linearly with frequency from approximately 10,000 to 50,000 cycles as shown in Figure 5. In this way, the outputs of amplifiers 8 to 16F inclusive of Figure 1 may be adjusted to the same value and the pre-emphasis networks 401, 402 will operate to produce the accentuations which will give the desired deviation ratios mentioned previously in the frequency modulated output of converter 100.

The outputs of pre-emphasis networks 401, 402 are fed through volume controlling potentiometers 413 and 414 and through radio frequency chokes 415 and 416 to the first grids 417, 418 of reactance tubes 403 and 404. Radio frequency by-pass condensers 419A and 420A are provided in order to further insure absence of radio frequency currents from the pre-emphasis networks and preceding apparatus. The cathodes 419, 420 of the reactance tubes are connected in parallel and to the common cathode return resistance-condenser circuit 421 consisting of resistor 421A and condenser 421B connected in parallel. This common cathode return serves to maintain constant grid bias on the reactance tubes since they are oppositely modulated. This, therefore, avoids a certain amount of degenerative feedback at low frequencies which would otherwise occur unless the by-passing condenser 421B is made very large.

A voltage doubling rectifier 422 is connected through high resistor 423B, switch 423C, by-pass condenser 423 to the potentiometer 414, as indicated, for monitoring purposes, it being noted that in this connection a milliameter 423A is provided. It is to be noted also that the meter 423A may be connected to the resistor bank 424A for indicating voltages and currents in various parts of the circuits, as will be evident to those skilled in the art. By means of the meter M and rectifier 422 the voltage input to the reactance tubes may be determined and adjusted so as to produce the desired frequency deviations in the oscillators 405, 406.

Quadrature voltage is fed to the grid 417 from the plate of oscillator tube 405 through the network consisting of blocking condenser 424, resistor 425 and condenser 426. As a consequence, the plate circuit of reactance tube 403 appears as a variable inductance to the plate circuit of oscillator 405, by-passing condenser 427 having a negligible effect in this regard.

Tube 405 acts as an oscillator because the tuned plate circuit 428 is coupled back on to the grid 429 through tickler coil 430 and by-pass condenser 431. The screen grid 432 of tube 405 is connected directly to the plate of that tube, as indicated, as a result of which tube 429 acts essentially as a triode.

Other circuit elements of the reactance tube 403, such as choke 433 for supplying plate voltage, by-pass condenser 434 and voltage dropping resistor 435 and similar elements for the oscillator 405, are believed to be understandable from the drawings and need not be discussed in detail.

Since reactance tube 404 and oscillator 406 are similar in all essential respects to reactance tube 403 and oscillator tube 405, there is no need to go into detail concerning the corresponding circuit elements which have just been discussed. It may be stated, however, that 404 also appears as a variable inductance across the circuit including tube 406, but since signal voltages cause tube 403 to become more conductive and 404 less conductive and vice versa, the frequency of operation of the oscillators 405 and 406 are varied oppositely. Hence, for a given frequency swing the effective range over which each oscillator is varied is made smaller, resulting in greater linearity in operation. The extent of this range is further effectively reduced by having these oscillators, namely 405 and 406 operate the frequency triplers 407, 408. The triplers serve to effectively triple the deviation produced in the oscillators and, hence, when the outputs of the triplers are beat together in mixer 100, the output of the mixer 100 contains a deviation which is of a value corresponding to three times the difference in deviations of the oscillators 405, 406.

The triplers 407, 408 are fed from the oscillators through coupling condensers 433, 434A. The triplers are overloaded vacuum tubes and, hence, by appropriate tuning of the plate circuits 435, 436, the third, or for that matter, any desired harmonic may be picked off. These output circuits may be broadened by the use of resistors 437, 438 and tuned by means of the variable iron cores 439, 440. Such variable iron core tuning is also indicated for the plate circuits of the oscillators 405, 406. The tripler tubes 407, 408 have their grids 441, 442 connected to ground through resistors 443, 444.

The chosen harmonic output of circuits 435 and 436 is fed through condensers 445 and 446 to the grid 447 of the mixer or detector 100. Consequently, if the output circuits 435 and 436 are tuned to the third harmonics of their preceding respective oscillators 405, 406, and assuming oscillators 405 and 406 to be operating at 8.5 and 8.83 megacycles in the absence of input at transformer 24, then the waves appearing in the output leads 101 will have a frequency equal to substantially one megacycle. As before explained, presence of signal in transformer 24 will cause the frequency of the waves appearing in leads 101 to vary as desired, depending upon the adjustment of potentiometers 413 and 414. These adjustments may be made such that this one megacycle wave appearing in leads 101 is frequency modulated plus and minus 170 kilocycles when all channels A to F inclusive are supplying maximum amplitude voltages to the amplifier 22 of Figure 1.

To summarize with reference to Figure 4, the band of frequencies from 30 to 48,000 cycles is pre-emphasized by the networks 401, 402 so that the input of the reactance tubes 403, 404 is flat over the frequency range from 30 to 10,000 cycles and rises linearly from 10,000 to 48,000 cycles. This characteristic is indicated in Figure 5. The volume of the input to the reactance tube modulators 403, 404 is controlled by means of potentiometers 513, 414. The reactance tubes 403, 404 serve to oppositely modulate the frequencies of oscillators 405, 406. Since 407, and 408 are operated beyond saturation, desired harmonics may be picked out by the tuned output circuits of the frequency multipliers 407, 408 and the deviation will be increased according to the order of the harmonic chosen. The outputs of the frequency multipliers 407, 408 are beat together in a mixer 100 and the output of the mixer or detector 100 is, therefore, a frequency modulated wave having very linear frequency deviation with amplitude of input applied at the reactance tubes. Such action is highly important in order to avoid undesirable cross-modulation of the signaling channels. The output of mixer 100 may be fed through a coaxial line having a grounded outer metallic tube and an inner conductor to the next stage of the system, namely, apparatus 104 of Figure 1.

In connection with the reactance tubes of Figure 4, such as, for example, tube 403, it is to be noted that the quadrature voltage developing condensers such as 426 should be made variable so that quadrature voltage feed-back may be controlled and reduced to any desired extent. Also by adjustment of the quadrature condenser, such as 426, the apparatus may be operated with optimum linearity. As set up each oscillator, such as tubes 405, 406 and its corresponding reactance tube, namely, 403 and 404, is substantially linear over a range of operation of approximately ±200,000 cycles. Of this range only a relatively small portion is used, for example, approximately ±30 kilocycles in order to insure extreme linearity of frequency modulation or frequency shift with the applied modulating voltages fed to the grids of the reactance tubes 403, 404 from potentiometer 413, 414. The precautions in the securing of extreme linearity are observed in order to reduce cross-modulation for it is at this point in the transmitting apparatus where cross-modulation due to non-linearity will tend to take place to the greatest extent.

The common band-pass amplifier 20 and common amplifier 22 of Figure 1 should be designed so as to have a wide flat characteristic of from 10,000 to 100,000 cycles to not only avoid the introduction of undesirable distortion and amplitude changes, but also to accommodate additional channels, if desired. Further, in order to minimize distortion and cross-modulation, amplifier 22 of Figure 1 should be operated on a linear portion of its characteristic. Amplifier 22 may include degeneration so as to improve linearity, if desired. Typical degenerative circuits and principles which may be used in connection with amplifier 22 are to be found in such patents as Black Patent 2,102,671 and Oman Patent 2,255,804.

Also, it will be noted that the reactance tubes 403, 404 of Figure 4 are operated over a relatively small range which is substantially linear so that distortion and cross-modulation are minimized. The circuits of the oscillator tubes 405, 406, such as the tuned output circuits and in particular the tuned output circuits of the triplers 407, 408, are made sufficiently broad so as to be substantially wider than the frequency swings of the currents fed to these circuits. The output circuit 435A of tripler 407 is broadened by resistor 437 so as to be flat over a band which is substantially wider than the frequency swing appearing in the output circuit of tube 407. For example, the characteristic of circuit 435A should be flat over a band of 400 kilocycles for a frequency swing of ±75,000 cycles. The output circuit of mixer 104 should be flat over a band 800,000 cycles wide where the maximum frequency shift of the waves appearing therein is ±150 kilocycles. In this way, phase distortion is kept to a very small value thereby further reducing the cross-modulation which may occur due to the unlinear phase characteristics of the circuits. In other words in order to minimize cross-modulation due to phase distortion, it is preferred that the frequency swing used in the circuits up to and including the mixer 104 be well within the flat portion of the amplitude frequency characteristics of the circuits involved.

A further advantage of the modulating system shown in Figure 4 arises from the fact that if the cathodes are energized with alternating currents and if the anodes or other electrodes are supplied with imperfectly filtered, rectified commercial sixty cycle power current, the variations in excitation will tend to cause the oscillators 405, 406 to change in frequency in the same direction. Hence, these changes in frequency tend to become self-cancelling in the mixer 100.

If desired, automatic frequency controlling circuits may be used in connection with the modulating apparatus of Figure 4. In that event, a part of the output appearing in lead 101A may be divided down in frequency and used to operate a reversible motor, in turn operating a tuning condenser of one of the oscillators 405, 406 such as the tuning condenser 490 of oscillator 405 or the plate circuit tuning condenser 492 of oscillator 406. Or, if desired, both tuning condensers may be actuated by the automatic frequency control motor in such a way as to bring the beat in 101A to its desired mean value. The manner in which the tuning condenser is varied by the frequency divided waves may be that arrangement as described in Morrison Patent 2,250,104.

Also if desired and in the alternative, automatic frequency control may be applied to one of the reactance tubes 403 or 404 by first heterodyning dwown a part of the output appearing in lead 101A with waves from a crystal controlled oscillator and discriminating and detecting the resulting beat for use in one or both of the reactance tubes 403, 404. This arrangement may follow the principles and apparatus described in Crosby Patent 2,279,659. Or, automatic frequency control, using part of the output appearing in lead 101A and a connection to the reactance tubes for that puropse, may be employed using the circuits and principles of Schaeffer Patent 2,274,434.

It should be apparent, therefore, that several advantages flow from the arrangement shown in Figure 4. For a given frequency deviation desired in the waves appearing in line 101, the oscillators 405, 460 need be varied only over a relatively small range. Hence, extreme linearity is secured in this portion of the apparatus. This is desirable for, otherwise, departures from linearity would produce relatively large amounts of cross-modulation. Furthermore, the arrangement of Figure 4 balances out and substantially reduces hum due to ripple in the plate voltage power supply and A. C. heating of the cathodes of the various tubes involved.

In Figure 6 there is shown a form of high frequency oscillation generator which may be used at 104 in Figure 1 and at 212 in Figure 2. Figure 6 also illustrates circuits for producing frequency modulation of the high frequency oscillator.

The oscillation generator of Figure 6 comprises an evacuated container 600 which may be of glass or metal, within which are contained a heated cathode 601, a screen electrode diagrammatically illustrated in section at 603, a cavity resonator 604, and a disc-like metallic anode or electron receiving plate 605. The cathode 601 is externally grounded at 602. The cavity resonator 604 is made of metal and consists of a metallic cylinder 606 having metal bases 607, 608. Mechanically and electrically fixed to the bases are the internally protruding sleeves or tubes 609, 610 separated so as to have between them a gap 611. The tube 600, cavity resonator 604, sleeves 609, 610 and plate 605 are shown in cross section.

Actually the cavity resonator may have different dimensions and be proportioned differently, than as shown in Figure 6. The distance between the bases 607, 608 may be equal to or less than the internal diameter of the cylinder 606, as shown diagrammatically in cross-section in Figure 6*a*. Also, the bases may be dished in and the cavity resonator have the toroidal or doughnut shape shown in cross-section in Figure 6*b*.

The anode 605 of Figure 6 is maintained at a negative potential of the order of −150 volts with respect to ground by means of lead 612 connected through resistors 613 and 614 to a suitable source of potential 615 by-passed to ground by means of the by-pass condenser 616. The cavity resonator 604, together with the grid 603 connected thereto, is maintained at positive potential of the order of +300 volts, for example, with respect to ground by means of lead 617 connected to a suitable source of potential 618 by-passed by condenser 619.

As a result of the foregoing construction, electrons emitted from the cathode 601 are attracted to and pass through the hollow portion of tubes 609 across gap 611 and through tube 610. The electrons then approach the negatively charged anode 605 only to be repelled and attracted back across the gap 611. In this way, the cavity resonator 604 is excited so that high frequency waves are set up therein at a frequency determined, in the main, by the cubical content of the cavity resonator 604. The frequency of operation is also dependent, to a certain extent, upon the voltages applied to the various oscillator elements.

Output energy is taken from resonator 604 by means of conductor 620 coupled by means of the inductive loop 621 to the space within the cavity resonator 604. Conductor 620 is suitably shielded by means of the externally grounded metallic coaxial conductors 621A, 622. The high frequency conductor 620 leads to and excites the transmitting antenna TA of Figure 1 or the relay retransmitting antenna TA-214 of Figure 2.

When the oscillator in Figure 6 is used in the transmitting arrangement of Figure 1, it is modulated by the output of the converter or mixer 100 of Figures 1 and 4. The output of mixer 100 is fed through conductor 101*a* to the anode circuit of anode 605 of Figure 6. In the case of the transmitter of Figure 1 conductor 101*a* will carry a frequency modulated wave of one megacycle having a maximum frequency deviation of $\pm 170$ kilocycles, according to the example chosen.

The waves in conductor 101*a*, referring to Figure 6, are resonated in the parallel tuned circuit 623 comprising coil 624, to which conductor 101*a* is variably tapped at tapping points 625, and condenser 626. The tuned circuit 623 is broadened by use of a loading resistor 627 connected in shunt to the circuit. By means of variable condenser 628, the frequency modulated waves appearing in line 101*a* are applied, in controllable amounts, to the plate 605. As a consequence, the output of the oscillator of Figure 6, appearing in lead 620, is frequency modulated to an extent which may be controlled primarily by adjustment of condenser 628, and secondarily by adjustment of tap 625.

Since the negative voltage applied to the lead 612 is fed through resistors 613, 614 which may, by way of example, be 22,000 and 180,000 ohms in value, respectively, leakage of the waves appearing in circuit 623 to ground through lead 612 is effectively prevented.

For monitoring and adjustment purposes, a portion of the high frequency waves fed through condenser 628 to the plate 605 may be shunted through high frequency by-passing condenser 629 to switch 630. The latter, in its upper contact position 631 feeds the rectifier 632 to the output of which is connected a suitable meter 633. The rectified output of rectifier 632 will indicate the voltage applied to plate 625 and will be a measure of the frequency deviation in the oscillations generated by the oscillation generator and fed to the output transmission line 620.

The service channel is fed through switch SCS of Figure 6, which corresponds to switch SCS of Figure 1, across a potentiometer 634. For modulating the high frequency oscillator of Figure 6 with the service channel voltages, the latter are fed through tap 635, audio frequency by-pass condenser 636, across resistor 614 and through resistor 613 and lead 612 to the anode 605 of the oscillation generator. By throwing switch 630 to the lower position 637, the extent of the frequency modulation produced by the service channel may then be measured by noting the reading on meter M which will then be actuated by rectified service channel voltages. For aurally monitoring the service channel an amplifier 638 and earphones 639 are provided, as indicated.

It is again repeated that all values of frequencies, resistances, voltages, etc. are given as illustrative or typical only and, therefore, it is to be clearly understood that all inventions described herein with reference to all figures of the drawings are not to be restricted to such values.

In Figure 6 the filament heating voltage source for cathode 601 is illustrated to be a battery but this battery may be replaced by a transformer supplying suitable alternating voltages to the filament for heating the cathode to an electron emissive condition. Also, the sources 618 and 615 for the cavity and plate may be replaced by potentiometers supplied with rectified commercial 60 cycle current. Such alternating currents for exciting the filament and the ripple in the rectified voltages may produce 60 cycle and 120 cycle frequency modulation of the output of the oscillator of Figure 6. This hum will therefore appear in the service channel. It will not appear, however, in the high quality channel A or in the channels B to F inclusive, since such low frequency modulation is effectively filtered out by the selective circuits for those channels.

This filtering action follows since there is a substantial separation in frequency between the first significant side bands produced by the subcarrier in the output of converter 100 and the side bands produced by the low frequency power modulation. The low frequency power modulation is produced by the 60 cycle heating supply or harmonics of 60 cycles representing ripple in the rectified power supply. This undesired low frequency modulation may also be produced by undesired mechanical vibration.

It is to be noted that oscillators of the type shown in Figure 6 are peculiarly susceptible to this low frequency type of frequency modulation due to mechanical vibration or the use of imperfectly filtered rectified power or due to the use of alternating current operation of the cathodes. It is one feature of my invention that the type of modulated oscillator shown in Figure 6, which is particularly susceptible to frequency modulation due to imperfectly filtered, rectified power or to the use of alternating current on the cathode, can be used without disturbing the signal.

Incidentally if it is desired to transmit a single channel, for example high quality channel A alone, amplifier 22 of Fig. 1 would be switch out of circuit so that across resistor 23, only voltages from channel A or amplifier 8 would be set up. Channel A would be adjusted so as to produce a full deviation of plus and minus 170 kilocycles in the output of converter 100. This simplex high quality signal could be radiated directly to the receiving apparatus of Figure 3 or relayed thereto through the apparatus of Figure 2.

If we assume that the high quality channel A is used to produce a single frequency modulation, that is to say, directly frequency modulate the radiated carrier as suggested, then the signal to noise ratio as compared to a corresponding amplitude modulation system will be equal to the square root of 3 multiplied by the deviation ratio. In this case it will be $$\frac{\sqrt{3}\times 1,000,000}{10,000}=173$$

This assumes, of course, that there is no stray frequency modulation or what might be termed the frequency modulation produced by A. C. operation of the filaments and produced by ripple in the power supply.

If a double frequency modulation system is used such as shown in Figure 1, in which the high quality channel is used to frequency modulate the output of converter 100 and this in turn to frequency modulate the output of the transmitter 104, I have found the signal to noise improvement over the amplitude modulation system previously referred to to be equal to $1.23 \times R1 \times R2$, where R1 is the deviation ratio in the output of converter 100 and R2 is the deviation ratio in the output of the high frequency transmitter. Hence, if the channel A of Figure 1 is used exclusively and the channels B to F inclusive are removed from the circuit and assuming channel A produces the full frequency modulation of plus and minus at 170 kilocycles in the subcarrier output of converter 100 and that this sub-carrier is used to produce a deviation of 1.17 mc. in the output of transmitter 104, the signal to noise ratio will be $$1.23 \times \frac{170,000}{10,000} \times \frac{1,000,000}{1,000,000} = 21$$

approximately. Hence, the double frequency modulation system is inferior to the single frequency modulation system insofar as decreased extraneous noise and natural disturbances are concerned.

However, as before explained, with oscillators of the type shown in Figure 6 which are susceptible to undersirable power supply frequency modulation, this disadvantage is in part, at least compensated. Of great importance, as explained herein, the use of double frequency modulation offers advantages in a system employing a number of repeater or relaying stations. This advantage is discussed more fully hereinafter in connection with the detailed description of Figure 8, composed of Figures 8*a* and 8*b*, representing the intermediate frequency amplifiers and limiters, and the discriminator detector 206, 208 of the relay station of Figure 2, and also the limiter and amplifier 210.

The frequency of operation of the oscillator of Figure 6 is determined by the dimensions of resonator 604 and may be controlled by providing suitable externally operated means for warping of the sides of the cavity resonator 604 so as to change its internal volume. Also, the frequency may further be controlled by adjustment of the voltages applied to the electrodes of the oscillator.

Figure 7 illustrates in greater detail the beating oscillator-converter apparatus designated schematically at 202 and 204 in Figure 2 and also at the position 304, 302 in the beating oscillator-converter combination of Figure 3. That is, the receiving antenna RA—200 of Figure 2 or RA—300 of Figure 3 is connected to the transmission line 700 of Figure 7. Line 700 is provided with an externally metallic shield 702, grounded at 704. Also, transmission line 700 is terminated by an inductive loop 705, thereby establishing coupling within the cavity resonator 706. If desired, transmission line 700, 702 may be replaced by a wave chute or guide.

The cavity resonator 706 is of metal and cylindrical in shape. Extending within the resonator 706 and connected to one of its bases is cylindrical line section 790 whose base 791 is adjacent and spaced from the metal circular base 792 carried by metal bellows 711. The line section 790 is tuned by means of this cylindrical metallic bellows 711 having, as indicated, springy corrugated side walls. By means of the bolt 714 and nut 715, the capacity between plates 791 and 792 is adjusted as is also the volume or internal cubical content of the resonator. Preferably the line section 790 is approximately one quarter wave length long—here about ¾ of one inch. This line section is tuned by adjustment of plate 792 to the frequency of the waves received and fed in at 705. A crystal detector 708 is mounted as shown with one terminal 795 in electrical contact with 706 and its other terminal 796 protruding through opening 797 in the cylindrical line section 790. Terminal 796 is connected to conductor or line 710. As a result, the crystal detector rectifies the waves fed in at 705 and 718 and feeds the resulting difference frequency of about 30 m. c. into line 710.

The cavity resonator 706 is also supplied with high frequency oscillations by means of a capacity end plate 718 fixed to an exposed section of transmission line 720 protruding within the resonator. The line 720 is excited by an automatically frequency controlled high frequency oscillator operating in the neighborhood of either 3030 megacycles of 2070 megacycles. The oscillator will be described more fully later.

The beat frequency is fed through line 710 shielded by the external conductor 712 to the primary 716 coupled to a secondary coil 726 tuned by condenser 728. The output of the tuned circuit 726, 728 is fed through line 732 to the first stage of the intermediate frequency amplifiers and limiters 206 of Figure 2 or 306 of Figure 3. The intermediate frequency amplifiers and limiters will be described more fully in connection with Figure 8.

The high frequency oscillator 738 of Figure 7 operating in the neighborhood of 2070 megacycles or 3030 megacycles is similar in all essential respects to the high frequency oscillator 600 of Figure 6.

In Figure 7, the oscillator comprises an evacuated container 738, a cathode 734, grounded at 736, a negatively biased plate 756, a positively charged cavity resonator 742, and a grid 744 connected to the resonator. The resonator 742, shown in cross section, is cylindrical in shape and is made of metal. The resonator has bases 752, 754 which are perforated and to which are attached the hollow metallic tubes 746, 750. The tubes are separated at an intermediate point so as to provide a gap 748. In a way similar to that explained in connection with Figure 6, oscillations are set up in the cavity resonator 742 of Figure 7 and wave output is derived from the inductive loop 740 coupled to the space within the cavity resonator 742.

The external surface of the cavity resonator 706 is grounded at 704 as indicated.

By properly choosing the dimensions of the cavity resonator 742 and by appropriate adjustment of the tube voltages, oscillation at a desired frequency may be had. As before indicated, by suitable external means the shape of resonator 742 may be warped so as to change its cubical content and, hence, its frequency of operation. Or, if desired, a metallic bellows adjustment, such as that provided for the cavity resonator 706 may be provided for 742, but in this case, of course, the container 738 should be hermetically sealed to resonator 742 so that a portion of its external surface containing and otherwise supporting the metallic bellows structure would be exposed for external adjustment.

The output appearing in the tuned circuit 726, 728 would be, for the example chosen, a wave as indicated in Figures 2 and 3 having a mean frequency of 30 megacycles and maximum frequency deviation of ±1.0 megacycle. This wave is fed to the intermediate frequency amplifying, limiting and discriminator detector stages, as will be explained more fully in connection with Figure 8.

Figures 7a and 7b show in greater detail an arrangement of apparatus which I have employed for the oscillator 738 and mixing and detecting system 706 of Figure 7. It will be noted that like reference numerals refer to like parts in these figures. Figure 7a is a plan view of the oscillator 738 and the mixing and detecting apparatus 706, the latter being shown in cross section for a clearer understanding of the apparatus. Figure 7b is a view of the apparatus of Figure 7a looking against the plane B—B, as indicated.

In Figure 7a adjusting bolt or screw A700 is used for the purpose of adjusting the volume of the cavity resonator within the tube and, hence, the frequency of operation.

By loosening bolt A702, bracket A704 may be moved along the grounded support A706 in order to control the position of the conductor 720 and capacity plate 718 within the cylindrical housing 706. In this way coupling of the oscillator 738 with the line section 790 and also with the space within cylinder 706 may be adjusted.

Crystal detector 708 has its upper terminal connected to the lead 710 corresponding to the internal conductor 710 of Figure 7. This connection is made by way of the spring contact A710 contacting with the upper terminals of the crystal 708 and insulatingly supported upon the base of and passing through the metal cylinder 706. The lower terminal of the crystal 708 is in direct contact with the grounded cylinder 706.

As shown in Figure 7b the antenna lead 700 within the external grounded conductor 702 is held within the split clamp A720 which is locked against the external conductor 702 by adjustment of the nut A722. It will be noted that the internal conductor 700 is looped at 705 and soldered or otherwise fixed to and connected directly to the external conductor 702. Hence, by simply moving external conductor 702 to the right or to the left, as shown in Figure 7b, the antenna coupling may be adjusted. It will be noted that the antenna coupling loop projects into cylinder 706 in a direction substantially at right angles to the position of the conductor 720 establishing communication with the high frequency oscillator 738.

The remaining portions of Figures 7a and 7b are believed to be self-explanatory in the light of the description given in connection with the schematic diagram of Figure 7.

The discriminator detector is diagrammatically illustrated at 208 in Figure 7 across the output terminals of which are connected resistors 782, 784, which, as will be explained more fully later, provide automatic frequency controlling voltages. These voltages may then be used to control the frequency of oscillator 738 so as to maintain the beat frequency waves within the pass band of intermediate frequency amplifying and limiting stages 206 of Figure 2 or 306 of Figure 3.

The frequency controlling circuit, for the oscillator 738, from which the automatic frequency controlling voltages are derived, is illustrated schematically in Figure 7 in connection with vacuum tube 760. More specifically, a source of voltage 765 is connected across the leads or terminals 776, 778, and these terminals are connected to a potentiometer 774. By properly adjusting the tap 772 on potentiometer 774, and by proper choice of values for other circuit elements, the current flow through, or the conductivity of tube 760, having the anode 762, grid 764, and the cathode 768, may be controlled so that the voltage applied through lead 758 upon the plate 756 is of a desired value, such as, for example, −150 volts. As indicated, the plate circuit for tube 760 is returned to ground through a resistor 761 shunted by condenser 792A and through the ground connection 763 to the source of potentials 765. It should, therefore, be clear that the automatic frequency controlling voltages appearing across resistors 782 and 784 will vary the current flow through the tube 760 and hence its effective resistance. Consequently, the voltage in lead 758 will vary in such a way as to control the oscillator in that direction which will bring the beat frequencies appearing in 726, 728 back to the desired intermediate frequency pass band of the IFA system 206 of Figure 2 or 306 of Figure 3.

Figure 8, consisting of Figures 8a and 8b, is a more detailed diagram of the intermediate frequency amplifier, discriminator-detector and limiter amplifier 206, 208, 210 of Figure 2. Figure 8 also represents in wiring diagram form the apparatus contained within rectangles 306, 308 and 310 of Figure 3. Figure 8c illustrates the characteristics and range of operation of circuits 814, 816 of Figure 8b.

That is, as before explained, the output of the converter 202 of Figure 2 or 302 of Figure 3 is a wave of intermediate frequency, such as 30 megacycles having a deviation of ±1.0 megacycle. This intermediate frequency wave, as before explained in connection with Figures 2, 3 and 7, is fed through transformer primary 716 to the tuned secondary coil 726 tuned by condenser 728, the lower terminal of the tuned circuit being grounded for high frequency currents by means of a by-pass condenser 730.

As indicated in Figure 8a, the output of the tuned circuit 726, 728 is fed through lead 732 to the amplifying tube 800 which forms part of the first amplifying stage of the intermediate frequency amplifier. The output of tube 800 is fed through properly tuned circuits 802 to the second amplifying tube 804. The output of amplifier 804 is fed through tuned circuits 806 to the amplifiers and limiters 808 and 810. To insure limiting action in tubes 808 and 810, either or both may be operated with reduced plate voltage. The output of limiter 810 is fed into a tuned circuit 812 tuned to the mid-intermediate frequency, and for the case described previously, to 30 megacycles. Circuit 812 excites the discriminator detector system comprising tuned circuits 814, 816 having the characteristics shown in Figure 8c and the double diode detector 818. Circuits 814 and 816 are tuned, as indicated, so as to have overlapping resonant characteristics. It will be observed, from an inspection of Figure 8c, that the first discriminator detector is operated at high sensitivity since the frequency swing of the I. F. waves extends from peak to peak resonant points of circuits 816 and 814. Even though this represents operation on relatively non-linear parts of the characteristic curves, as explained earlier, this will not result in any serious distortion or cross-modulation of the ultimate signal waves. The peaks of these characteristics may, therefore, be separated by an extent equal to or only somewhat greater than the band of signalling frequencies fed through the intermediate frequency amplifying and limiting stages 800 to 810 inclusive. That is, the peaks are separated by more than 2.34 megacycles.

The output of the discriminator detector system 814, 816 and 818, appears across resistors 782, 784 shunted by high frequency by-passing condensers 820, 822 and fed through tuned circuit 824, broadened by the loading resistor 826, to the control grid of the amplifier 828. Circuit 824 is tuned to have a mean frequency of one magacycle corresponding to the mean frequency of the output of discriminator detector 208 and this corresponds to the mean frequency of the output of the converter 100 of Figure 1. Condenser 830 is of such value as to pass the waves of one magacycle plus and minus deviation of 170 kilocycles, but substantially impedes or otherwise blocks the frequencies of the service channel SC of Figure 1. The service channel frequencies are, therefore, fed through conductor 832, resistor 786 and condenser 836 to the audio amplifier 838 in the output of which there is provided a suitable monitoring jack 840. Also there is provided a patch cord or lead 842 suitably tapped to the plate resistor 843 in case it is desired to modulate the high frequency oscillator 212 at the relaying point with the service channel for transmittal on to the next station whether the latter be another relaying point or terminal receiving station. The method of injecting the service channel for modulation purposes of the high frequency oscillator, such as 212, has already been explained in detail in connection with the apparatus SCS, 634, 635, etc., shown in Figure 6 and hence further explanation of the injection is deemed unnecessary.

The sub-carrier frequency output of amplifier 828 (Figure 8) is fed through tuned circuit 844, amplifier limiter 845, tuned circuit 846, amplifier limiter 847, tuned circuit 848, by-passing condenser 849, and transmission line 850 to the frequency modulated oscillator 212 of Figure 2. This oscillator, as before explained, is identical in all essential respects to the oscillator of Figure 6, and it will be appreciated that lead 850 of Figure 8 will, therefore, correspond functionally with the lead 101*a* of Figure 6. It will be appreciated, of course, that circuits 844, 846, and 848 of Figure 8 are tuned to the sub-carrier frequency resulting from the first discriminator detector action of 814, 818 at the relaying or receiving points. Accordingly, if used at a relaying point, such as shown at Figure 2, these circuits would be tuned to one megacycle and designed so as to be broad enough to pass a band of frequencies of ±170 kilocycles.

It is to be noted that a portion of the output of the discriminator detector arrangement 814, 816, 818 of Figure 8 is used to automatically frequency control the first beating oscillator 204 of Figure 2 or 304 of Figure 3 to maintain the beat frequency output of the converter 202 of Figure 2 or 302 of Figure 3 to lie within the by-pass band of the intermediate frequency amplifier 206 of Figure 2 or 306 of Figure 3. That is to say, a part of the output of detector 818 of Figure 8 is fed through lead 832, resistor 786 and resistor 790 to the grid 764 of tube 760. Resistor 790 and condenser 792, the latter connected between grid 764 and ground, are chosen so as to have a time constant sufficiently fast to substantially remove the quick variations in voltage due to the modulating frequencies of the service channel. The slower variations in voltage representative of frequency drift are fed to the grid 764 so as to either increase or decrease the conductivity thereof. Accordingly, the voltage on lead 758 varies in such a way as to automatically frequency control the first beating oscillator 202 at the relaying points or 302 of the terminal receiving points as explained more fully and in greater detail in connection with Figure 7.

Should the intermediate frequency of one megacycle in the arrangement of Figure 8 fail for any reason, it will be noted that the D. C. voltage built up across resistor 860 in the grid circuit of limiter tube 845 by the normal signal will also fail. Hence, the negative voltage in conductor 861 will drop to approximately zero. As a consequence, the normal negative bias on the grid 862 of tube 863 will drop to approximately zero and this tube will conduct plate current through plate 864, lead 865, resistor 866, conductor 867, and relay coil 868, thereby effectively grounding point 869. In other words, point 869 will be brought effectively to the potential of cathode 870 of tube 863.

As a result, oscillator 871 previously blocked by application of positive potential, derived from point 869, to its grid 872 will go into oscillation and produce oscillations of a frequency determined by the tuning of its grid circuit 873 which is preferably tuned to some frequency in the intermediate frequency pass band, such as, for example, 1.1 megacycles. A part of the output of oscillator 871 is fed through lead 874 to a point 875 in tuned circuit 824. The voltage built up across circuit 824 by waves from the local oscillator 871 is adjusted so as to be of much lower amplitude than the normal intermediate frequency signals passing through the system, as a result of which, the direct current voltage built up at 860 in the grid return for tube 845 is not sufficiently great to cut off the local oscillator 871. Hence, when transmitted signals fail to come through by measuring this intermediate frequency at some later point in the system, it will be known that failure occurred prior to that particular point in the system using an oscillator, such as 871 tuned or otherwise adjusted so as to produce a frequency of 1,100,000 cycles. There is a further advantage to this arrangement in addition to its failure indicating function. Should the signal intermediate frequency of one megacycle fail, then it will be found that the noise level will tend to rise abruptly. The presence of the injected wave from such oscillators as 871 of Figure 8 will curtail and otherwise suppress this rise in noise voltage.

Also in order to indicate failure of the intermediate frequency signal, the relay 868 may be used to close a contact 870A completing circuit from a source of potential 879 to an alarm bell 880 and an indicating light 881. If desired, contact 870A may be used to operate a coding device in turn used to key a tone which may be fed into the service channel or be permanently connected to the service channel so as to give a further indication, according to the particular code and tone frequency employed, of the point at which break-down occurred.

Figure 9 illustrates in greater detail the oscillator 313 and converter amplifier apparatus 311 of Figure 3. It will be recalled that the output of the intermediate frequency amplifier 310 is a wave having a mean frequency of one megacycle. This frequency is raised to a frequency such as thirteen megacycles by operating the oscillator 313 at twelve megacycles. In this way, the percentage of deviation in the waves prior to the second discriminator-detector action is reduced and the circuits of the second discriminator 312 may more easily be designed to have a linear discriminating detecting action for the frequency swing involved.

The output of amplifier and limiter 310 of Figure 3 is fed through the internal conductor 850 of a concentric transmission line corresponding to the output conductor 850 of Figure 8 to the shielded input transformer system 900 of Figure 9. The secondary 902 excites the control grids of the push-pull converter tubes 904, 906 in phase opposition with the intermediate frequency waves having a mean frequency of one megacycle.

The local oscillation generator 908 is provided with a tuned grid circuit 910 and feed-back coil 912 so as to produce oscillations of, for example, twelve megacycles. The locally generated oscillations are fed through a lead 914 in push-push or in parallel to the control grids of the converter tubes 904, 906. The plates of the tubes 904, 906 are connected to opposite sides of the tuned circuit 916 which is tuned to the sum frequency, that is to say, to a mean frequency of thirteen megacycles.

Condensers 901 and 903 are made variable so that by adjustment, oscillations from oscillator 908 may be fully cancelled or suppressed in circuit 916. A more convenient way to accomplish this, I have found, is to use a variable cathode return potentiometer 905. By adjusting the gain of tube 906 by adjustment of the tap on resistor potentiometer 905 balancing out of the oscillations from 908 in circuit 916 may quickly be secured. Of course, if desired, both adjustments may be used to eliminate the locally generated wave from circuit 916.

This circuit is broadened by a resistor 918 so as to have a substantially flat amplitude-frequency characteristic over the band of frequencies to be transmitted, namely, thirteen megacycles plus and minus 170 kilocycles. The band of frequencies is fed through the tuned circuit 920 to the amplifier and limiter 922 and then through further tuned coupling circuits 924, 926 to the amplifier and limiter tube 928.

The output of limiter 928 is fed into a discriminator circuit 930 connected to a diode detector 932. The discriminator-detector 930—932 of Figure 9 represents the apparatus within the rectangle 312 of Figure 3, the output of the discriminator-detector appearing, as indicated in both Figures 3 and 9, in the output transmission line 313. It should be clear, therefore, that the output of transmission line 313 of Figure 9 will be the modulating band of frequencies occupying the range from 30 to 48,000 cycles corresponding to signaling channels A to F inclusive of Figure 1.

The service channel of Figure 3 had previously been taken through the amplifier and filter connected to the output of the first discriminator-detector 308, this filter passing the band from zero to 5000 cycles and feeding the local service channel patch cord SLR of Figure 3 which is similar in all essential respects to the service channel lead 842 of Figure 8.

Returning again to Figure 9, the discriminator-detector system 930, 932 corresponding to 312 of Figure 3 consists of a primary tuned circuit 934 consisting of a coil 936 and condenser 938. Tuned circuit 934 is tuned to have a characteristic similar to the previously mentioned tuned circuits 916, 920, etc. The lower terminal of coil 936 is connected through a by-passing condenser 940 to a point 942 intermediate the secondary coils 944 and 946. The latter are tuned by condensers 948 and 950 and also by adjustable iron cores 952 and 954. Tuned circuit 944, 948 is tuned to a frequency lying far removed from one side of the intermediate frequency band fed thereto, as shown in Figure 9*a*, and circuit 946—950 is symmetrically tuned to a frequency lying far removed from the opposite side of the intermediate frequency band fed through amplifier limiter tube 928. The resonant peaks of the tuned circuits are separated in frequency, as shown in Figure 9*a*, so that the frequency difference between them is many times greater than the band of frequencies passed through the amplifying and limiting system 922, 928. Thus, as shown in Figure 4*c*, the admittance band width of the discriminator, which converts the frequency variations in the waves fed through tube 928 to amplitude changes prior to detection in detector 932, is of the order of five times that of the band width occupied by the frequency modulated waves.

As a result, there is, of course, a loss in sensitivity. This loss is tolerated in order to obtain the freedom from distortion and cross-modulation secured by operation over a small and very linear portion of the discriminator characteristic. Also, the apparent loss in sensitivity or signal strength may be recovered by use of suitable amplification in the signal frequency amplifiers following the second frequency discriminator-demodulator 930—932 of Figure 9.

In order to correct or deemphasize the band of signaling frequencies appearing at terminal 313 previously pre-emphasized by the pre-emphasizing network PN of Figure 4, a deemphasizing network, as shown in Figure 9, comprising a resistor 966 and condenser 966A, is provided. Resistor 966 may be given a value of from 40,000 to 50,000 ohms and condenser 966A a capacity of from 100 to 200 micromicrofarads.

Any changes in amplitude in the waves fed to the input circuit 934 of the discriminator system are accordingly balanced out in the output load resistors 960—962 which are connected through lead 964 and resistor 966 to provide a single ended output for the transmission line 313.

It should be noted that, but for frequencies employed, the modulators of Figure 1, such as 12B and the local oscillator 10B, may be made identical in all essential respects to the converter system of Figure 9 represented by oscillator tube 908 and converter tubes 904, 906. In that case, the push-pull input through such circuits as 902 would be the low quality voice channels B to F, indicated on Figure 1, and the oscillators 908 would be tuned to the frequencies of the oscillators 10B to 10F inclusive represented on Figure 1. Similarly, the demodulating converters 66 to 74 inclusive and their associated oscillators 67 to 75 inclusive of Figure 3 may use circuits such as described in connection with oscillator tube 908 and converter tubes 904, 906 of Figure 9. In this event, the input to the converter tubes 904, 906 would be, for example, the twelve to sixteen kilocycle input for channel B and the corresponding tuning for oscillator 908 would be 16 kilocycles.

Accordingly, the flexibility of many portions of the apparatus involved in the system described should be self-evident. It will also be noted that the system may be connected to present-day commercial telephone lines which are capable of carrying the bands of frequencies represented by channels A to F inclusive of Figures 1 and 3.

It is preferred to employ highly directive antenna systems since, in view of the short-wave lengths employed, they will not be unduly large. By using, for example, parabolic directive structures for securing directivity at both the receiving and transmitting antennas, and if only a fraction of a watt is radiated, a power gain equivalent to many kilowatts, non-directively radiated and received, will be secured.

A typical short wave antenna system which may be used as any one of the antennas diagrammatically illustrated in Figures 1, 2 and 3 is shown in Figure 10. The transmission line to the antenna consists of a hollow internal conductor 1000 having a grounded external conductor 1002. Connection to either a transmitter or receiver may be made at the connecting plug and socket point 1004.

A parabolic metallic reflector 1006 may be held in place as indicated by a nut 1008.

The antenna consists of a dipole element 1010 screwed into the internal conductor 1000. The cooperating antenna element 1012 is soldered, brased or otherwise mechanically and electrically fixed to the grounded external conductor 1002.

A circular metallic disk or plate 1020 is connected as shown to the far end of the transmission line 1002. The metallic parabolic reflector 1006 and dipole arrangement 1001, 1002 are enclosed within a waterproof plastic cover 1022.

When the system of Figure 10 is used for transmitting, radiation from the dipole arrangement 1001, 1002 impinges against the disk or plate 1020 from which the waves are reflected against the parabolic reflector 1006. The latter, in turn, radiates, by reflection, a highly concentrated beam of radio waves. For reception substantially opposite action takes place, the received waves being concentrated against the antenna 1011, 1012 by the action of the parabolic reflector 1006 and the metallic disk 1020.

If desired, one or more of channels B to F inclusive may be made to be high quality voice channels in which the upper limit may be made 10,000 cycles or 15,000 cycles as desired. In that case, of course, the sub-carriers used at points such as 10B, 10C, etc. would be increased so as to carry the high quality channels fed to their respective modulators.

In setting up the system it may be desirable to have some measure of the signal-to-noise ratios of the various channels as compared to amplitude modulation. Single amplitude modulation will be used as the standard of comparison since the factors involved in the signal-to-noise ratio in amplitude modulation and demodulation are well understood. The noise considered and referred to herein is random noise such as tube and circuit noise. Furthermore it will be assumed that the signal will in each case be above the noise threshold value.

Considering direct transmission from a transmitting point to a receiver and assuming the same modulation frequency band width, the signal-to-noise ratio improvement of frequency modulation over amplitude modulation is known to be equal to the square root of three multiplied by the frequency swing divided by the maximum modulation frequency or, in other words, equal to the square root of three multiplied by the deviation ratio.

I have found that for the system of Figure 1 the improvement which may be expected for channel A is equal to 1.23 times R1R2 where R1 is the deviation ratio in the output of converter 100 and R2 is the deviation ratio in the waves radiated from the transmitting antenna TA. This expression gives the improvement of channel A as compared to a single channel amplitude modulation system having the same frequency response as channel A and with 100% modulation.

Also, I have found that each of the remaining channels B, C, D, E and F have improvement factors over amplitude modulation, as referred to above, equal to .707 R1R2, where R1 is the deviation ratio in the output of converter 101 and R2 the deviation ratio in the wave output of the high frequency transmitter 104.

The difference in improvement factors is due to the fact that channel A has a substantially triangular noise characteristic, whereas channels B to F inclusive each has a noise spectrum which is approximately rectangular in shape.

As explained previously, the system described herein offers considerable advantages in the matter of minimizing cross-modulation due to phase distortion. Also, as before explained, it is important to solve this problem especially in the case of a system employing a large number of relaying points. The cross-modulation due to phase distortion may further be reduced in the following ways:

A. By using inter-stage coupled circuit transformers in place of the single tuned circuits for the 1.0 mc. amplifiers and by adjusting for maximum flatness of the phase characteristic of these coupled circuit transformers, cross-modulation may be decreased still more by as much as ten to one. More specifically, tuned circuits 824, 844 and 846 of Figure 8b may, for this purpose, be replaced by pairs of inductively coupled parallel tuned circuits. These tuned circuits may be shunted, if desired, by broadening resistors such as 826 of Figure 8b. The adjustment for maximum flatness is obtained by adjusting the coupling between the parallel tuned circuits. In the case of coupled circuits 848 of Figure 8b and parallel tuned circuit 624, 626 of Figure 6 this optimum coupling, insofar as linear phase characteristics are involved, may be obtained by suitable adjustment of tap 625 on coil 624 and by suitably adjusting coupling condenser 849.

B. By using wider band widths on the 1.0 megacycle sub-carrier circuits, such as a circuit 623 of Figure 6 and circuits 824, 844 and 846 of Figure 8b, more linear phase characteristics may be secured resulting in further reduction in cross-modulation due to phase distortion. At the risk of some repetition, by phase characteristics of a tuned circuit is meant the characteristic secured by plotting phase shift produced by the circuit against frequency off of the resonant frequency of the circuit.

C. From what has been said it should be evident that by using less deviation per channel more linear operation, insofar as the phase characteristic is concerned, may be secured. Thus, referring to Figure 1, the input at 24 for each of the channels A to F inclusive may be adjusted to a lesser value so that the deviation in the output of converter 100 is less than ±170 kilocycles for a condition when all of the channels are instantaneously additive.

D. Finally by insertion of circuits having phase characteristics of an opposite curvature so as to correct the overall phase characteristic of the system, phase distortion may further be lessened. Such networks may be inserted in, for example, one in every ten relay stations in a long chain of radio relays, each of which may be constructed along the lines of Figure 2.

Thus, up to a certain relaying point, the system may have an overall phase characteristic of a generally concave shape. Then at the following relaying point a correction or compensating circuit may be introduced between, referring to Figure 2, the limiter-amplifier 210 and the frequency modulated oscillator 212. This correction circuit is made to introduce a phase characteristic of opposite curvature which, for the case assumed, would be convex. More specifically, referring to Figures 8b and 6, the correcting circuit would be introduced between transmission line 101A and tap 625 of Figure 6. This correcting circuit may be in the form of an amplifier having a plurality of vacuum tube amplifying stages. The circuits and coupling between the stages should be designed so as to give the desired compensating or correcting phase characteristic. This inserted network, it is to be noted, need not be used for amplification unless such action is desired but, as explained, will be used principally for securing the insertion of a desired compensating phase characteristic.

Having thus described my invention, what I claim is:

1. The method of relaying a doubly angle modulated wave which includes subjecting the wave to a single angle demodulation so as to derive waves of single angle modulation, and utilizing the latter to angle modulate a locally generated wave.

2. The method of relaying a doubly frequency modulated wave which includes receiving the wave, subjecting waves derived from the received wave to a single frequency demodulation, and utilizing the latter wave to frequency modulate a locally generated high frequency carrier.

3. The method of relaying a doubly frequency modulated wave which includes receiving the wave, heterodyning the wave to a doubly frequency modulated wave of intermediate frequency, subjecting the latter wave to a single frequency demodulation so as to derive a wave subjected to a single frequency modulation, and utilizing the latter wave to frequency modulate a locally generated carrier wave.

4. The method of relaying a doubly frequency modulated wave which includes receiving the wave, heterodyning the wave to a suitable intermediate frequency, amplifying the wave of intermediate frequency, subjecting the wave of intermediate frequency to a single frequency demodulation so as to derive a wave containing a single frequency modulation, and utilizing the latter wave to modulate a locally generated wave, and utilizing waves derived from the last-named modulation for retransmittal.

5. Multiplex transmitting apparatus comprising a plurality of primary signaling circuits, a modulator connected to each of said circuits, oscillators operating at different frequency connected to said modulators, single side band filters connected to said modulators for transmitting only a portion of the outputs of said modulators, circuits for combining the outputs of said filters, a pair of oscillation generators coupled so as to produce a sub-carrier frequency beat, circuits for oppositely angle velocity modulating said last-mentioned oscillators whereby the resulting beat is angle modulated, a generator for generating a wave of higher frequency than said beat, and circuits utilizing said beat to angle modulate the output of said last-mentioned generator.

6. The method of transmission which includes producing a single side band from signaling waves and a relatively low frequency locally generated wave, utilizing the side band to oppositely frequency modulate a pair of sub-carrier waves, beating the sub-carrier waves together to produce a common frequency modulated sub-carrier wave and utilizing the common frequency modulated sub-carrier wave to frequency modulate a locally generated high frequency carrier.

7. A relay station for relaying double angle modulated waves comprising a receiving antenna and a retransmitting antenna, a local heterodyning oscillation generator for heterodyning waves received upon the receiving antenna to an intermediate frequency, a discriminator-detector for subjecting the waves of intermediate frequency to a single angle demodulation so as to produce waves having a single angle modulation, a high frequency oscillator coupled to said retransmitting antenna, instrumentalities for utilizing a portion of the output of said discriminator-detector, namely, said single angle modulated waves, to angle modulate the output of said high frequency oscillator coupled to said retransmitting antenna, and a circuit for utilizing another portion of the output of said discriminator-detector to automatically frequency control said local heterodyning oscillation generator.

8. A multiplex transmitter comprising a plurality of signal channels, a common amplifier for amplifying the outputs of said signal channels, a distorting network having a flat characteristic over a lower band of frequencies appearing in the output of said amplifier, and a rising amplitude versus frequency characteristic over the remaining high frequency portion of the band of frequencies appearing in the output of said amplifier, said distorting network being connected to the output circuit of said amplifier, a pair of reactance tubes adjustably connected to said distorting network, a pair of oscillation generators each operating at a different frequency oppositely controlled in frequency by said reactance tubes, a frequency multiplier connected to each of said oscillators, a mixing circuit for mixing and beating together the outputs of said frequency multipliers, and a circuit for utilizing the output of said mixing circuit.

9. Apparatus as claimed in claim 8, characterized by the fact that the output of said mixer is used to frequency modulate a third oscillation generator.

10. A receiver for receiving and translating a doubly frequency modulated wave comprising a first discriminator-detector having relatively high sensitivity and an admittance band width substantially equal to the maximum band width of the received waves, and a second discriminator-detector system excited with waves derived from the first discriminator-detector system, said second discriminator-detector system having an admittance band width of the order of five times that of the band width occupied by the waves applied thereto.

11. The method of relaying a doubly frequency modulated wave which includes receiving the wave, heterodyning the wave to a suitable intermediate frequency, limiting the wave of intermediate frequency, subjecting the limited wave of intermediate frequency to a single frefrequency demodulation so as to derive a wave containing a single frequency modulation, utilizing the latter wave to frequency modulate a locally generated wave and utilizing waves derived from the last-mentioned modulation for retransmittal.

12. Multiplex transmitting apparatus comprising a plurality of primary signalling circuits, a modulator connected to each of said circuits, oscillators operating at different frequencies connected to said modulators, single side band filters connected to said modulators for transmitting only a portion of the output of said modulators, circuits combining the outputs of said filters, a pair of oscillation generating circuits coupled to a common circuit so as to produce a sub-carrier frequency beat in said common circuit, circuits utilizing the combined outputs of said filters for oppositely angle modulating oscillations fed to said common circuit whereby the resulting beat is angle modulated, a generator for generating a wave of higher frequency than said beat, and circuits utilizing said beat to angle modulate the output of said last-mentioned generator.

13. High frequency transmitting apparatus comprising a channel adapted to contain signalling waves, a pair of oscillation generating circuits coupled to a common circuit so as to produce a sub-carrier frequency beat in said common circuit, circuits for oppositely angle modulating oscillations fed to the common circuit by waves in said signalling channel whereby the resulting beat is angle modulated, a generator for generating waves of higher frequency than said beat and circuits utilizing said beat to angle modulate the output of said last-mentioned generator.

LELAND E. THOMPSON.

REFERENCES CITED

The following references are of record in the file of this patent:

UNITED STATES PATENTS

| Number | Name | Date |
|---|---|---|
| 1,633,100 | Heising | June 21, 1927 |
| 1,677,966 | Green | July 24, 1928 |
| 1,695,180 | Clement | Dec. 11, 1928 |
| 2,000,130 | Espenschied et al. | May 7, 1935 |
| 2,148,532 | Chaffee | Feb. 28, 1939 |
| 2,260,160 | Benning et al. | Oct. 21, 1941 |
| 2,264,608 | Armstrong | Dec. 2, 1941 |
| 2,287,044 | Kroger | June 23, 1942 |
| 2,288,025 | Pomeroy | June 30, 1942 |
| 2,294,942 | Varian et al. | Sept. 8, 1942 |
| 2,298,409 | Peterson | Oct. 13, 1942 |
| 2,304,388 | Usselman | Dec. 8, 1942 |
| 2,305,882 | Lindenblad | Dec. 22, 1942 |
| 2,339,198 | Smith | Jan. 11, 1944 |
| 2,357,975 | Roberts | Sept. 12, 1944 |
| 2,379,052 | Weaver | June 26, 1945 |
| 2,381,758 | Kenefake | Aug. 7, 1945 |
| 2,407,212 | Tunick | Sept. 3, 1946 |
| 2,421,727 | Thompson | June 3, 1947 |
| 2,458,124 | Wilmotte | Jan. 4, 1949 |